(12) United States Patent
clements

(10) Patent No.: US 11,347,354 B1
(45) Date of Patent: May 31, 2022

(54) LASER MID-AIR HOLOGRAM TOUCH INPUT BUTTONS FOR A TOILET BIDET

(71) Applicant: sigmund lindsay clements, montreal (CA)

(72) Inventor: sigmund lindsay clements, montreal (CA)

( * ) Notice: Subject to any disclaimer, the term of this patent is extended or adjusted under 35 U.S.C. 154(b) by 518 days.

(21) Appl. No.: 16/396,730

(22) Filed: Apr. 28, 2019

Related U.S. Application Data

(63) Continuation-in-part of application No. 15/206,288, filed on Jul. 10, 2016, now Pat. No. 10,275,098.

(60) Provisional application No. 62/297,804, filed on Feb. 20, 2016, provisional application No. 62/213,630, filed on Sep. 3, 2015.

(51) Int. Cl.
| | | |
|---|---|---|
| *G09G 5/00* | (2006.01) | |
| *G06F 3/042* | (2006.01) | |
| *G03H 1/00* | (2006.01) | |
| *E03D 9/08* | (2006.01) | |
| *G03H 1/26* | (2006.01) | |

(52) U.S. Cl.
CPC ............. *G06F 3/0426* (2013.01); *E03D 9/08* (2013.01); *G03H 1/0005* (2013.01); *G03H 1/26* (2013.01); *G03H 2001/0061* (2013.01)

(58) Field of Classification Search
CPC ....... G06F 3/0426; E03D 9/08; G03H 1/0005; G03H 1/26; G03H 2001/0061
See application file for complete search history.

(56) References Cited

U.S. PATENT DOCUMENTS

2015/0000026 A1 * 1/2015 clements ................... E03D 9/08
4/443

* cited by examiner

*Primary Examiner* — Stacy Khoo

(57) ABSTRACT

A smart toilet with a bidet, and a midair input display. The input display is bacterial free, due to the display being made of air molecules excited by lasers, that produce lights in midair. The produced lights are holograms. A user contacts the holograms, with their finger. The holograms have a touch feel. Contact with one of the holograms with the finger, is detected by a camera, and is associated to an activation of the hologram, and an activation of a bidet operation associated to the hologram. Each hologram shows a different operation of the bidet, by either the hologram or a sign associated to the hologram. Some of the operations of the bidet, wash the user's elimination areas, with water directed from the bidet. Some of the bidet operations include, bidet back wash, front wash, change of bidet water temperature, and change of water pressure.

20 Claims, 6 Drawing Sheets

LASER MID-AIR HOLOGRAM TOUCH INPUT BUTTONS FOR A TOILET BIDET

CROSS REFERENCE TO RELATED APPLICATIONS

This application is a continuation in part CIP application of application Ser. No. 15/206,288, filed Jul. 10, 2016, and patent issued Apr. 30, 2019 with patent Ser. No. 10/275,098, with title Laser Mid-Air Hologram Touch Input Buttons for A Device, and naming present applicant as inventor, with application Ser. No. 15/206,288 claiming the benefit of provisional patent application Ser. No. 62/191,447 filed on Jul. 12, 2015, 62/213,630 filed on Sep. 3, 2015, and 62/297,804 filed on Feb. 20, 2016. All of the forgoing applications are herby incorporated herein by reference in their entirety.

FEDERALLY SPONSORED RESEARCH none

SEQUENCE LISTING none

BACK GROUND FIELD OF THE EMBODIMENTS

Discussed embodiments relate to touch inputs displays, located in mid-air.

BACK GROUND OF THE EMBODIMENTS

Avoiding Bacteria

Many people don't like to touch input buttons, that have bacteria on them, such as, on a smart toilet's control panel. Input buttons touched by multiple users, can accumulate germs on their surfaces.

The germs can be transferred, back and forth between the buttons, and the different users' fingers. The more users who touch the buttons, such as, on a smart toilet control panel, the more the chance of users introducing harmful bacteria to the buttons.

Avoiding finger contact with touch input buttons, reduces the contact, and transmission, with possibly harmful pathogens on the buttons. Reducing or eliminating bacterial transmission from the buttons to the user, reduces the possibility of the user becoming ill, from bacteria transmitted to the user.

Avoiding Bacteria by Using a Smart Phone

A smart phone can be used, to operate a smart toilet. The phone frees a user, from touching smart toilet input buttons, that have been touched by other users. Though the user may need to carry the phone, hold and operate the phone while sitting on the toilet.

Avoiding Bacteria with a Mid-Air Hand Sensor

A sensor for detecting a hand in mid-air, can allow a user to operate a device. Infrared hand sensors are used, to operate devices in bathrooms. The sensors allow for operation of a device, without touching a surface. Devices using the sensors include, sink water faucets, toilet flushers, and air flow hand dryers. In Hospitals motion sensing sensors are used to open doors, so users don't have to touch surfaces that may contain germs, and to stop users from leaving germs on input surfaces.

A problem with the sensors, is the user may wonder where the mid-air activation plane is located, since the user doesn't receive visual or feel distance feedback before the switch activates. Trying to judge the distance to the activation plane, may allow the user's hand to touch a surface near the switch.

Water Droplet Displays

Some mid-air displays use holograms. One type of display uses laser light beamed onto fog, to create a mid-air hologram. A problem with fog holograms, is fog water droplets need to be produced, by a fog producing device which needs a water supply, for the laser light to reflect off of to create the hologram. The fog display, lacks touch feedback, when touching a hologram, about their finger's location in mid-air.

Optical Illusion Displays

Mid-air holograms can also be created by using mirrored optical illusions. Ultrasonic transducers can be used to give the user mid-air touch feedback, which is associated to the hologram. The combined hologram and mid-air touch create, mid-air visual objects with mid-air touch.

A problem with optical illusions, is an accumulation of dust on mirrored surfaces, used to produce the optical illusion, which may degrade the clarity of the optical illusion hologram. The midair ouch may not be located in the exact position as the illusions, which can lead to differences between the visual touch and the touch feel locations.

Ineffective Ways to Avoid Bacteria

Some people try to wrap paper around their hand, before touching smart toilet control panel buttons, in an effort to try to put an antibacterial barrier between their hand and the buttons. The paper barrier is ineffective, since bacteria can easily travel through paper.

People may try to use a piece of clothing, such as, a part of a shirt sleeve as a barrier between the buttons, and the hand. The shirt sleeve may act as a barrier; thought bacteria can attach to the user's shirt sleeve.

Disposable rubber gloves may be effective, in using the buttons sanitarily, though it may be inconvenient to carry, and use gloves. Anti-bacterial swipes can be used to eliminate bacteria on buttons, though the discarded wipes produce waste.

Disadvantages of Mid-Air Touch Input Control Panels for a Smart Toilets (a) Fog holograms need water droplets to produce a hologram. The displays need a water supply, which maybe inconvenient. They don't have touch feed back.

(b) Optical illusion holographic displays may have a problem with dust accumulating on mirrors, used to create the optical illusion. The dust may diminish the clarity, of optical illusion holograms, and they no haptic touch feedback.

(c) Touch free sensors like those used in sinks, don't give a user visual, and touch feedback, about the location of a mid-air input area. The user needs to visually see the surface, that their trying to avoid. The user needs to stop the forward motion of their finger, toward the surface. Contact with the surface, increases the chance of transferring bacteria between the surface and the user's finger. Sensors usually operate an on or off switch, lacking a plurality of different input buttons, due to the inability to identify, multiple function buttons.

(d) Remote controls, such as, a telephone, need to be carried by a user. If the control is used by many users, users may transfer each others bacterium.

SUMMARY

This Summary is provided to introduce a selection of concepts in a simplified form, that are further described below in the detailed description.

The above deficiencies, and other problems associated with interacting with touch screen displays for a toilet, are reduced or eliminated by laser input buttons. The claimed subject matter, is not limited to implementations, that solve any or all of the noted disadvantages.

Toilet Midair Display

A smart toilet has an input display, that has holographic input buttons, which float in midair. A user can touch the floating holograms, to operate the toilet. Detecting a touch of one of the holograms, by the user's finger, is associated to an activation of the toilet operation, associated to the hologram being touched.

A Laser Creating Floating Holograms

A femtosecond laser device creates a floating hologram, which also has mid-air haptic touch. The laser device creates floating holograms, of a three-dimensional volumetric display. The laser device is connected to a computer, and the computer is connected to a camera. The computer is connected to a toilet bidet.

The laser creates a plasma, by exciting oxygen and nitrogen molecules in the air. The plasma is a fluorescence luminescence plasma. The plasma is viewable by the user.

The holographic display is capable of producing images in mid-air, without the need of screen or external refraction media. The laser plasma display, is able to depict very bright, and visible objects.

The excitation of the air molecules, by the laser, can also be felt by touching the plasma. The excited air molecules generate shockwaves, which the user feels as a pulse when touched. The plasma produces mid-air haptic touch.

The plasma creates a sound. The sound is in an acceptable volume range of 20-55 decibel. The sound can allow the user, to audibly locate the hologram.

Many lasers can be grouped together. Each laser can show, a different hologram. Each hologram can be an input button that shows an operation of the bidet, that the button is associated to. A different device function, can be associated to each hologram. The different holograms can be grouped, to create input display control panels, such as, a smart toilet's input buttons, or a vending machine's input numbers. Each hologram can be a different letter of an alphabet, to create a keyboard.

A Camera Detects Touch of a Hologram

The camera is positioned, to view the user's finger touching the holograms. A finger gesture software in the computer, detects from the images received from the camera, the user's finger touching the hologram.

The hologram is associated to an operation of a device. The user's input of the hologram activates, the function associated to the operation of the device. The computer sends the activated function, to the device. The device use's the received operating function, to operate the device.

For example, a laser operating display for a smart toilet, detects the touch input a front wash icon of the display, which is displayed in midair. The camera detects the fingers contact with the icon, and registers, enters the detection as an activation of the front wash operation of a bidet in the toilet, in the computer.

The activated front wash operation, instructs the bidet to activate the front wash operation of the bidet. The bidet operation directs a stream of water to the front position of a user, with the activation of the front wash operation.

User Input Detection Area

Different input areas can be created at the hologram, or around the hologram. The user input area can be set, to be detected, when the finger is near the hologram, without the finger contacting the hologram. The input area can be on the other side of the hologram, with the finger contacting the hologram.

Visual and Touch Feedback Helps Avoids Contact with Bacteria on a Physical Surface The haptic feedback from the hologram, allows a user to avoid contacting a surface, with their finger, while mid-air inputting a hologram. The feedback allows the user to stop the forward motion of their finger toward, a surface near the hologram. Stopping the finger from contacting the surface, allows the user to avoid contacting bacteria on the surface.

Avoiding finger contact with bacteria on the physical panel, eliminates the transference of possible harmful bacteria from the surface to the finger. Reducing exposure to bacteria, may increase a user's chance to avoid being contaminated by bacteria.

Visual feedback of contact with a hologram, may include, a changing of shape, changing design, increase in brightness, change in florescence, and or a changing of color of the hologram. The computer changes the shape, brightness, color, design, when the computer detects the fingers touch of the hologram.

The changes inform the user, that the hologram button has been touched, and activated. The changes can also inform the user that their finger is close to the button, and or that the user's finger is perpendicular, and on the path to activate the button.

The holograms can be visually attractive. The holograms can change to create visually pleasing colors, shapes, and movement.

There are many advantages to users, who receive mid-air finger location information, while using a mid-air panel with holographic buttons, and mid-air haptic touch to activate icons arranged as an input display for a toilet.

Advantages

In the preceding description, a number of advantages of the embodiments of touch holograms for a toilet become evident:

(a) A smart toilet holographic input control panel can be operated bacterially free. Operating free of bacteria, is useful for the toilet's operating panel that may have bacteria, on the input surfaces.

(b) Feeling haptic touch when they touch the holograms, allows the user to be aware they have contacted the toilet holograms. Being informed of their contact with the hologram, gives the user information about their finger's location in mid-air, which allows the user to avoid touching a surface with bacteria on it. The user is able to stop, the forward motion of their finger toward the surface of the display.

(c) The user is aware they have contacted the toilet control panel holograms, by visual feedback, such as, a brightening of the hologram, or a changing shape of the hologram.

(d) Laser smart toilet holograms reduce the mental energy, needed to calculate the location of the hologram in midair, and to operate a mid-air display, by receiving touch and visual information, about their finger's location, in relation to mid-air touch buttons.

(e) The smart toilet holograms are visually attractive.

Using mid-air holographs with mid-air touch feedback, to mid-air input, into a midair touch input panel for a toilet, brings the future, of sanitary, and safe mid-air touch input of bidets to the present.

BRIEF DESCRIPTION OF THE DRAWINGS—FIGURES

REFERENCE NUMBERS

Figure 1:
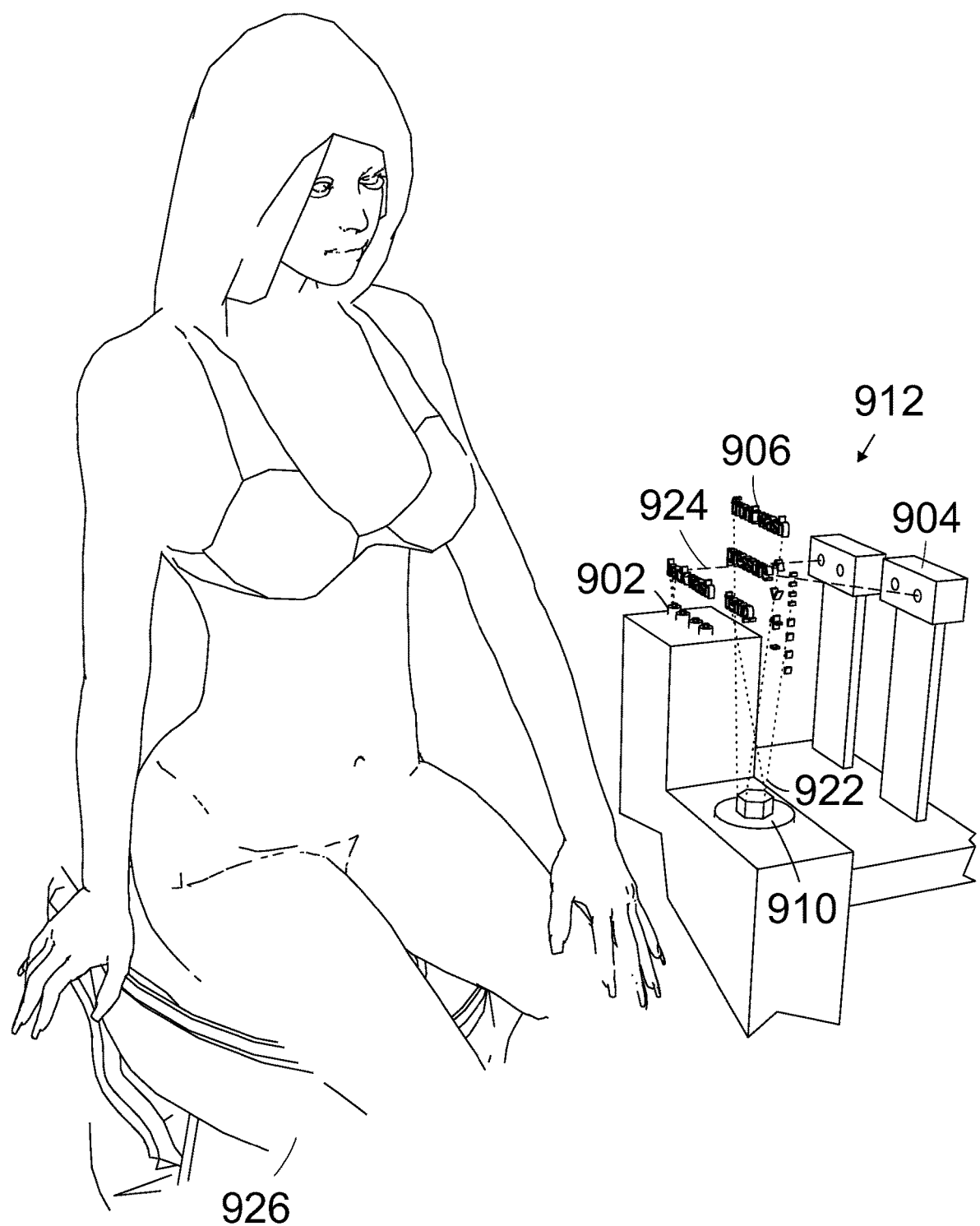
FIG. 1 shows a perspective of view a mid-air touch input toilet control panel.

102 femtosecond laser devices
104 hand gesture recognition camera
106 mid-air hologram and mid-air haptic touch area
108 mid-air input area
112 light switch
116 finger
122 laser beam
124 camera viewing area
202 femtosecond laser devices
204 hand gesture recognition camera
206 mid-air hologram and mid-air haptic touch area
216 finger
228 on
230 off
232 speaker
902 femtosecond laser devices,
904 hand gesture recognition camera,
906 mid-air hologram and mid-air haptic touch area
910 big femtosecond laser device,
912 toilet control panel,
916 finger,
922 laser beam,
924 camera viewing area,
926 toilet
928 increase hologram,
930 decrease hologram,
932 water pressure
934 indicator lines,
935 temperature indicator hologram,
936 increase hologram,
938 decrease hologram,
940 pressure scale
942 pressure indicator hologram,
944 indicator lines Further features of the holographic toilet display embodiments, its nature and various advantages will be more apparent from the accompanying drawings, and the following detailed descriptions of the embodiments.

DETAILED DESCRIPTION FIRST EMBODIMENT

A Bidet Control Panel Displayed by Holograms in Midair
Description
Laser Bidet Control Panel A electronic bidet is positioned to direct water, at a user's front or back position, while the user sits on the toilet. The bidet has a wand, or wands that stream water to the user's elimination positions. The water washes the elimination positions. The user stops the water flowing after being washed. The bidet has a warm air dyer that the user starts, that dry's the elimination positions, after the user has stopped the streaming of the water.

A touch midair holographic input display is connected to the bidet. The laser display, allows the user to touch holograms on the display, to operate different functions of the bidet. The touch activation of the holograms in midar, is associated to activating operations of the bidet, that the activated holograms are associated to.

The user feels the contact of their finger, with the hologram. The user views the contact, of their finger with the hologram. The feel and view feedback, that the finger has touched the hologram, allows the user to avoid more forward movement of their finger in midair.

Avoiding more forward movement of the finger, may keep the finger from touching a physical surface, that may have bacteria on it. The laser display allows the user, to operate the bidet, with touching bacteria. The feel and view feedback, allows for decreased effort to discern the finger has contacted the hologram.

Lasers

Figure 2:
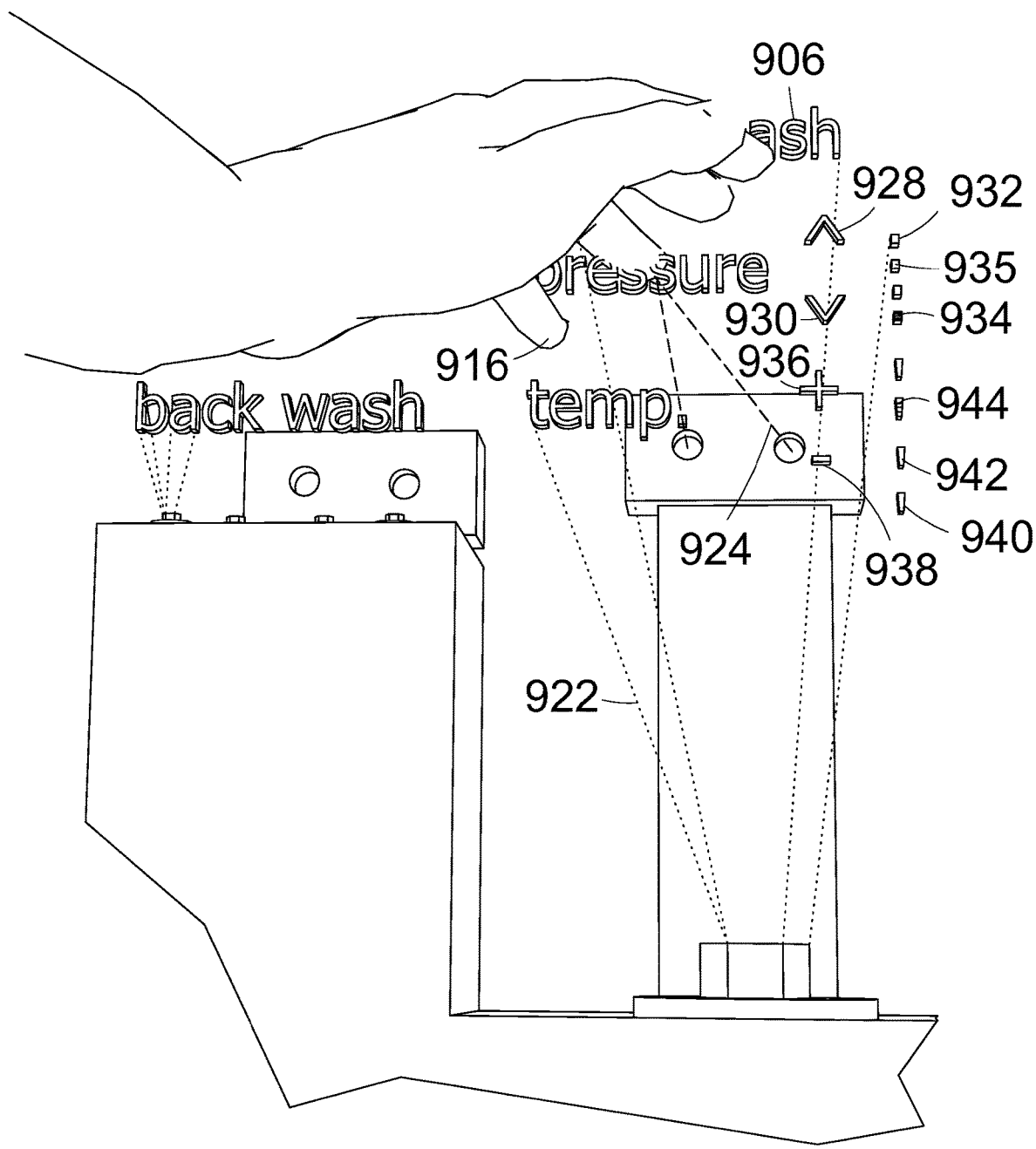
FIG. 2 shows a perspective of view a mid-air touch input toilet control panel.

Femtosecond lasers 902 are positioned, to create a control panel for the toilet's bidet, as illustrated in FIGS. 1 and 2. The toilet is a smart toilet having the bidet, and the bidet is electronic, or electric. The femtosecond lasers produce laser beams which ionize air molecules. The ionized molecules produce photon-emitting pockets of plasma, which produce light in midair.

The lasers are positioned, to each project a hologram, with laser beams 922. The holograms 906 are 12 cm from the lasers. The holograms are spaced 1 cm horizontally from each other. A big femtosecond laser, and smaller laser supporting devices 910 create the holographic smart toilet control panel display 912, 14 cm from the lasers.

The holograms 906 can be directed outward from the laser at distances ranging from 2 cm to 4 meters or more. The holograms can start at 2 cm and got out to 4 meters. The holograms can be different sizes ranging from 2 cubic cm to 3 cubic meters or more.

Different Sized Holograms

Individual holograms, have different sizes, such as, large size 906 visually show an input display for the smart toilet bidet in midair. The display shows inputs for the operations of the bidet, that include, back wash, front wash, water temperature decrease, and increase water pressure. The lasers are connected to a computer. The computer is connected to a smart toilet bidet 926.

Mid-Air Hand Gesture Recognition Cameras

Two mid-air hand gesture recognition cameras, or sensors, 904, are located to view a user's finger's 916 contact within a mid-air area around a hologram. The midair contact areas 924 are located 0.2 cm below the holograms. The cameras are connected to the computer. The viewing range of the cameras is from 20 cm to 3.25 metres.

The cameras can detect when a user's finger is near one of the holograms, and or is contacting one of the holograms. The finger's detected contact of the hologram, is associated to an activation of the hologram detected being contacted. The activated hologram is associated to an activation of one of the operations of the bidet.

More Bidet Descriptions

The toilet bidet is connected to the femtosecond laser input display. The holograms, three dimensional volumetric displays, are associated to the different operations of the bidet. The operations may include, a variety of different holograms, or hologram inputs, such as, words, numbers, symbols, or letters, for selecting a variety of different bidet operations.

The holograms each display a descriptor, that that describes the activation of the hologram's association to an activation of an operation of the bidet that the hologram is associated to. For example touch activation of a hologram, displaying a descriptor with text or symbol, for a backwash, is associated to activating a backwash operation of the bidet.

The femtosecond laser devices are positioned, to each project a hologram 9 cm from the lasers. The holograms are spaced 0.2 cm horizontally from each other The holograms could be projected farther from the laser, such as, 12 cm, 16 cm, or 23 cm, etc.

Four lasers are positioned to each project a hologram 9 cm from the lasers, and which are located 0.2 cm from each other. The displayed text, includes, front wash, back wash, water temperature settings warm water, water pressure, water pressure increase, or water pressure decrease.

Mid-Air Hand Gesture Recognition Sensors

A mid-air hand gesture recognition sensor, or sensors, or camera, or cameras, are located to sense a user's finger's contact within predetermined mid-air areas near the holograms. The predetermined areas are located 0.3 cm above the holograms. Sensors may be ultrasonic imaging sensors.

The cameras, or sensors are connected to the computer. The computer is part of the bidet. The lasers are connected to the computer.

Software

The toilet's computer has operating instructions, software, for the various functions, and devices of the bidet, cameras, and lasers, such as, finger recognition software, bidet software, and laser operation software.

Different Possible Laser and Computer Connections

The lasers can produce holograms, without being connected to the bidet computer, with the lasers producing the holograms independent of the computer. The lasers may have a laser computer, that isn't connected the bidet computer. The laser computer could be connected to the bidet computer. The bidet computer may change the shape of the hologram, due to a detection of a touch of the hologram.

Flow Charts

The object detection and selection mechanism is described below with reference to flowchart illustrations and or block diagrams of methods, apparatus (systems) and computer program products according to implementations thereof. It will be understood that each block of the flowchart illustrations, and or block diagrams, and combinations of blocks in the flowchart illustrations and/or block diagrams, can be implemented or supported by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Operation Flowchart

Figure 6:
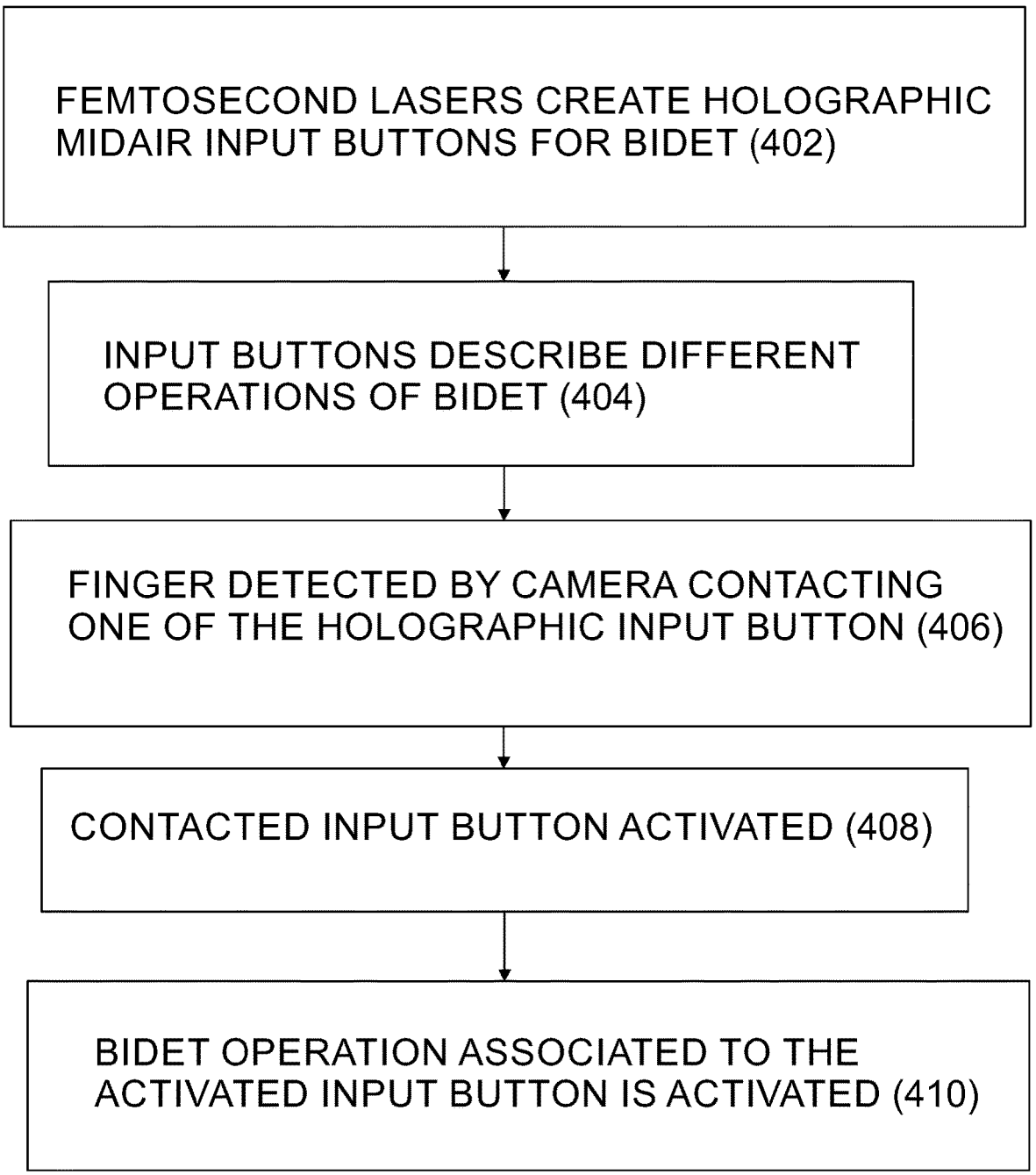
FIG. 6 shows a block diagram, of the connections between the hardware components, between a holographic toilet control panel, which is connected to a toilet bidet.

In the toilet control panel, a software and operation flowchart, the following steps illustrate the panel's operation, as shown in FIG. 6, femtosecond lasers create holographic midair input buttons for bidet (402), input buttons describe different operations of bidet (404), finger detected by camera contacting one of the holographic input button (406), contacted input button activated (408), bidet operation associated to the activated input button is activated (410).

Operation Flowchart Expanded

In the toilet control panel, a software and operation flowchart, the following steps illustrate the panel's operation, displaying a input display for a bidet, the bidet positioned in a toilet, comprising, exciting air molecules in mid-air with a plurality of laser beams, exciting the air molecules to produce light with the plurality of laser beams, having the excited air molecules give a touch feel when contacted by a finger of a user, describing the operations of the bidet with the light, detecting the finger in the location as one of the described operations with a sensor positioned to detect the finger in the location of one of the described operations with the sensor connected to a computer, activating the described operation of the finger detected at the location of the described operation with the detection of the finger at the location of the described operation associated to the activation of the described operation at the location of the finger, activating the bidet operation associated to the activated described operation by associating the activated described operation to activating the operation of the bidet that is described with the computer connected to the bidet, displaying the activated operation of the toilet on the display, one of the input buttons is a front wash button, one of the described operations is a front wash operation, one of the described operations is a back-wash operation, one of the operations of the bidet is a back-wash operation, the sensor is a camera, one of the input buttons is a decrease water pressure input button, connecting the lasers to the computer, influencing a shape of the described operation when the described operation is activated with the computer influencing the shape of the describe operation when the described operation is activated, the described operations are holograms, connecting a speaker to the computer, producing a sound from the speaker with the detection of the user's finger at the location of the described operation.

Block Diagram of Components

A block diagram of the connections between the hardware components, used to create the holographic bidet control panel, are shown in FIG. 6, holographic toilet input buttons (302), femtosecond lasers (304), toilet bidet (308), midair finger gesture recognition camera (310).

A Bidet Control Panel Displayed by Holograms in Midair Operation

Touch of One of the Midair Holograms

Mid-air touch input of one of the holograms, by the user's finger contact with one of the holograms, inputs a request to the computer, to activate the bidet operation, that the activated hologram is associated to, as illustrated in FIGS. 1 and 2.

The computer directs the smart toilet to carry out the input request of the user. For example, the user touches the front wash input hologram. The front wash input is detected by the sensor, and the computer. The computer directs the smart toilet, to start a front wash. The front wash device of the bidet sprays water at the user's front position. The user touches a stop hologram, or the front wash hologram again while the water is being sprayed, to stop the flow of water to the front position.

Touch Activatable Toilet Operations Displayed in Midair

The wash pressure can be increased or decreased while the water is flowing or before the water starts flowing, by touching an increase 928 or decrease hologram 930. The increased or decreased desired pressure, in shown on an indicator 935 hologram on a water pressure scale 932. The pressure of the wash is shown on the pressure scale, by indicator lines 934, shown on one of the pressure indicating hologram's lines 934. The water pressure scale 932 shows, from a low to high pressure range.

The wash water temperature can be increased or decreased, by touching an increase 936 or decrease hologram 938. The increased or decreased temperature in shown on an indicator 942 hologram, on a water temperature scale 940. The temperature of the wash is shown on the temperature scale, by indicator lines 944, shown on one of the temperature indicating hologram's lines 944. The water temperature scale 940 shows from a low to high temperature range. Other toilet settings can include, water spray patterns, such as, an oscillating spray.

More Toilet Operations Displayed on the Toilet Operating Panel

A touch activated displayed icon command activates the smart toilets operation associated to the icon command. Touch of the smart toilet icon command activates the command being touched, for example, activation of a displayed increase water temperature icon, activates the increase water temperature operation of the electronic bidet in the smart toilet. The increased water temperature operation increases the water temperature of the water flowing from the bidet.

A touch activation of the decrease water temperature hologram icon, activates the decrease water temperature operation of the bidet. The operation of the decreased water temperature operation, decreases the water temperature of the water flowing from the bidet.

A touch activation of the back-wash hologram icon activates, the back-wash operation of the bidet in the smart toilet, the back-wash, or anus wash operation directs water flowing from the bidet at the user's back elimination position, or anus.

An activation of a front-wash icon activates, the front-wash operation of the bidet in the smart toilet, the front-wash operation directs water flowing from the bidet at the user's front elimination position, vulva, or female bladder opening area or vaginal opening area. The user touches the stop hologram, or the backwash hologram again to stop the water flow to the back position.

A touch activation of the decrease water pressure hologram, activates the decrease water pressure operation of the bidet in the smart toilet. The activated decreased water pressure operation, decreases the water pressure of the water flowing from the bidet. An activation of the increase water pressure icon, activates the increase water pressure operation of the bidet in the smart toilet. The activated increased water pressure operation, increases the water pressure of the water flowing from the bidet.

When a bidet operation is activated, the icon brightens to show that the operation is activated, for example, the back-wash operation is touch activated, the backwash icon brightens. When the backwash operation is turned off, the backwash icon returns to the brightness that the backwash icon was, before its brightness was increased.

Other commands associated to the operation of the bidet, and the operations description, include oscillating water spray pattern, warm wash, hot wash, cool, wash, start, stop, bottom dryer temperature increase, and bottom dryer increase air flow. The activation of the oscillating operation of the bidet, activates the oscillation of the water stream by the bidet water wand.

More Operation Examples

The user operates the smart toilet, having the electronic bidet. The bidet has a wand or wands that stream water to either the user's front or back elimination areas. The water cleans the elimination areas. The bidet's operating menu is displayed. The menu shows input icons, whose functions are associated, to operations of the bidet.

In another embodiment a start hologram can used to start a bidet operation, where the operation hologram is highlighted by touch, and then the start is touched to activate the highlighted operation, like, the front wash is touch highlighted, and the start button is touch pressed activate the highlighted front wash operation.

An activated bidet icon input, operates the associated bidet device. The menu shows input options such as, front wash, back wash, water temperature settings warm water, water pressure, water pressure increase, or water pressure decrease.

In another embodiment different operations can be inputted and then started at the same time. For example, the user uses touch to activate, the back wash setting, a warm water temperature setting, and increases the water pressure, and a start icon. The bidet starts the directing of warm water, at the user's back position. The toilet's display, shows the operation of the toilet.

Example of Display Operation

The display is connected to a smart toilet bidet. The smart toilet's operating input icons, are displayed. A two-dimensional 2D or 3D back wash smart toilet icon, is displayed.

The user touches the backwash icon. The backwash icon highlights.

The user touches the icon. The backwash icon is activated.

The activation of the back-wash icon, is associated to the command, to activate the back-wash function of the toilet. The computer sends the toilet, the activated back wash function to the toilet. The toilet actives, the back-wash function of the toilet. The user is washed, with the toilet back wash water stream, as they sit on the toilet.

More Bidet Operation Examples

The user touches the icon command they want to activate with their finger, such as, the front wash, or vulva wash input icon, for an amount on time, such as, 0.2 seconds. At the 0.2 second time, the front wash input icon command is highlighted. An additional touching of the icon of 0.4 seconds or touch of a start icon, activates the front wash icon.

When the front wash icon command is activated, and the front wash operation of the bidet is activated, and bidet washes the user's front of their posterior. The user touches the front wash input icon or stop icon, when the front wash is operating, to stop the front wash water. The user can active another command, after the first command is activated.

The computer directs the smart toilet, to carry out the input request of the user. For example, the user touches the back-wash icon. The back-wash input is detected by the sensor and the computer. The computer directs the smart toilet, to start a backwash.

The user touches the back-wash icon, to activate the back-wash icon. The activated back-wash icon, signals the bidet, to activate the bidet's back-wash.

Toilet Operations Displayed

When a toilet icon is activated, the toilet transmits to the hologram display, that the icon is activated. The toilet sends data about the status of the activated device, such as, the time left for the bidet front wash, water stream pressure, or temperature of the water. The data sent from the toilet, is displayed on the mid-air display.

The displayed data keeps the user informed, about the toilet's operation, and interaction with the user. The user can use the displayed toilet data, to adjust the operation of the toilet, such as, increasing the time of the front wash, decreasing the waters pressure, decreasing the waters temperature, and changing the oscillating water spray, water spray pattern, and pulsating water spray.

The water pressure can be increased, or decreased, by touching the increase, or decrease hologram. The increase, or decrease of pressure in shown on an indicator hologram on the pressure scale. The pressure of the water is shown on the pressure scale, by indicator lines, shown on one of the pressure indicating holograms. The scale shows from a low to high pressure range.

The water temperature can be increased or decreased, by touching the temperature increase or decrease hologram. The increased or decreased desired temperature in shown on an indicator hologram on a temperature scale.

The temperature of the water is shown on the temperature scale, by indicator lines, shown on one of the temperatures indicating line holograms. The scale shows, from a low to high temperature range. The user input of the holograms, detected by the cameras, is used to operate the toilet.

Operation of the Bidet

The user's touches the bidet icon, they want to activate. Touch of the icon activates the icon. A signal that the bidet icon is activated is sent to the bidet device, to operate the bidet.

The touch holograms detect the user's touch, of the bidet's increase water temperature icon. The detection of the touch, of the temperature icon, and the detection of continued touch of the temperature icon, activates the icon.

The computer sends, the bidet the activated increase water temperature icon function. The bidet receives, the increase water temperature icon function. The increase water temperature function influences the operation of the bidet. The water temperature of the water stream, from the bidet is increased.

The computer receives information from the bidet, that the water temperature has increased. The received water temperature increase is displayed by the water temperature scale, on the screen, and is viewable by the user.

The user touches the increase water temperature icon, to activate the increase water temperature icon. The activated increase water temperature icon, signals the bidet computer, to the increase the bidet's water temperature.

Example of Inputting Multiple Operations into the Bidet

The user touches the front wash icon, the warm wash icon, the low-pressure icon, start icon. The bidet directs water to the user's front position. The user touches the increases temperature icon, and increase time, by 28 second. The water temperature is increased, and the time of the water being sprayed is increased.

The water stops when the displayed time is ended. The air dryer starts when the water stops. The user presses the stop button, to stop the air dryer, the air dryer stops. The user vacates the toilet when the bidet stops operating.

The user uses touch to activate, a back-wash setting, a warm water temperature setting, and increases the water pressure, and a start icon. The bidet starts the directing of warm water, at the user's back position. The toilet's display, shows the operation of the toilet, doing the warm water, and back wash operation.

More Bidet Operating Examples

The user's hand moves to the displayed back wash setting icon, and touches the icon to activate the backwash icon. The back wash setting, warm water temperature setting, increase the water pressure, and the start icon are displayed together.

The bidet starts the directing of warm water, at the user's back position. The toilet's display, shows that the back wash is operating by an increase in brightness of the backwash icon.

Example of Smart Toilet Operation

The user touches the front wash hologram to activate the front wash icon, the warm wash icon, the low-pressure icon, start icon. The bidet directs water to the user's front position. The user's hand touches the increases temperature icon. The water temperature is increased, and the time of the water being sprayed is increased.

The water stops when the stop icon is touched. The air dryer starts when the user touches the start dryer button. The user's hand touches the stop dryer button, to stop the air dryer, and the air dryer stops. The user vacates the toilet when the bidet stops operating.

Hologram Visually Describe the Operation of the Bidet That the Hologram Is Associated to. The displayed hologram visually describe the operation of the bidet that the hologram is associated to, like, the hologram will say back wash, or display a symbol for a back wash. The touch activation of the back-wash text, is associated to an activation of the backwash operation of the bidet.

Each displayed input hologram corresponds, to an operation of the bidet that is described by the holograms, for example, the back-wash hologram when activated by the user's touch of the hologram, activates the back-wash operation of the bidet's computer.

Holograms can Also be Associated to Displayed Bidet Commands by a Sign Description and Operation The holograms can also be physically associated, to displayed bidet commands, or described operations. The bidet operations, bidet commands can be described by a sign with text, or a sign with symbols that describe the activation of the operation of the bidet that the activation of the described operations is associated to.

Each hologram is associated to a sign displaying a descriptor, that describes the activation of the hologram's association to an activation of an operation of the bidet that the hologram is associated to. For example, a touch activation of a hologram, associated to a sign descriptor with text or symbol, for a front wash, is associated to activating a front wash operation of the bidet.

The described operations are underneath the holograms, or next to the bidet operations holograms. The user can view the bidet operations holograms, and the described operations at the same time.

Each physically displayed bidet command visually describes the operation of the bidet that the displayed bidet command is associated to, like, a described back wash, or a symbol displayed for a back wash is associated to an activation of the back-wash operation of the bidet.

The touch activation of the star, is associated to an activation of the physical described back wash. The activation of the physical described back operation of the bidet is associated to the activation of the backwash operation.

The holograms can be different in shape, then the described operations, written words or symbols that are displayed near the hologram, and the hologram is associated to. For example, a front wash input is displayed near a hologram in a shape of a yellow circle, and the yellow circle is displayed above the front wash. The yellow circle is associated to the front wash, by the yellow circle's visual location in relationship to the front wash's location.

Touch activation of the star, is associated to an activation of the front wash. The activated front wash, activates the front wash command in the computer. The activated front wash computer command, carries out the front wash command of the computer, which activates the bidet to spray water at the front position.

The displayed commands can be on an electronic display, or a printed, or sculpted, like, raised letters in plastic. The laser beam used to create the hologram above the back wash, can be perpendicular, or parallel to the back-wash location.

For example, a back-wash input is displayed, and a hologram is displayed above the back wash that is in a shape of a cube. The cube is associated to the back wash, by the cube's visual location in relationship to the back-wash's location.

Touch activation of the cube, is associated to an activation of the back wash. The activated back wash, activates the back-wash command in the computer. The activated back wash computer command, carries out the back-wash command of the computer, which activates the bidet to spray water at the back position.

For example, back wash, front wash, and increase water pressure operations are displayed, on a display screen. Next to the displayed back wash is a blue, green, and purple butterfly hologram floating in midair, and a touch activation is associated to the activation off the back wash by the both of their locations. Next to the displayed front wash is an orange sphere midair, and next to the displayed increase water pressure is a red pyramid midair.

The user touch activates the butterfly, which activates the associated back wash, and the back-wash operation is activated, which sprays water at the back location.

The user touch activates the orange sphere, which activates the associated front wash, and the front-wash operation is activated, which sprays water at the front location.

The user touch activates the red pyramid, which activates the associated increase water pressure, and the increase water pressure operation is activated, which increases the water pressure being sprayed.

The air dryer starts when the user touches, a hologram in a shape of a flower. The activation of the flower is associated to a displayed start dryer button. The user's hand touches the flower, to stop the air dryer, and the air dryer stops. The user vacates the toilet when the bidet stops operating.

The Associated Hologram can be the Same as the Sign

The associated hologram can be the same as the sign, for example the hologram can say back wash, and the sign can say back wash. The activation of the back wash hologram, is associated to activating backwash sign operation, which is associated to activating the backwash operation of the bidet.

The user touch activates the back wash hologram, which activates the associated back wash bidet operation, and the back-wash operation is activated, which sprays water at the back location.

Alternate Embodiments

Fast Food Self Serve Restaurant Hologram Kiosks Description

Hand Tracker and Finger Gesture Sensor

A fast food self-serve restaurant has a kiosk with a display. The display shows, restaurant food and drink menu item, prices of the items, and payment options. A hand tracker, finger follower, and hand gesture, finger gesture sensor, camera, hand gesture radar, are positioned to view, to sense a user's hands, and fingers, when one of their hands touches a hologram on the display, in midair, and within view of the hand trackers.

A hand gesture radar, is connected to a computer, and the computer has hand gesture software, and finger following software. The hand tracker views, and tracks the hand, in mid-air. The hand tracker views and detects the user's hand's, and fingers gestures, in mid-air. The distance that the fingers are detect is from 0.2 to 4 meters, or farther from the display.

Sensors Detect User's Hands

A session to order food items from the kiosk, is activated by the user touching one of the holograms with their hands. If gloves are worn on the hands, the cameras still detected the user's fingers touch of the holograms.

The user feels the contact of their finger with the hologram. The user views the contact of their finger with the hologram.

Multiple users can operate touch holograms on the display, at the same time. Two or more users can touch holograms, and operate the display at the same time, inputs are detected consecutively.

Camera Following Finger

The finger camera, hand tracker is connected to the display computer. The computer has hand, and finger gesture recognition software. The finger camera is part of the kiosk or display. The finger camera views the user's fingers.

The holograms are displayed as input icons, on the display. The icon is a small picture on a computer screen that the user chooses by hand gesturing in midair in order to open a particular program. The display is a laser hologram display, or part laser hologram display and electronic display, screen, or monitor.

For example, a user's finger contacts a ham pizza hologram icon on the display. The contacted ham pizza icon is activated. The activated ham pizza icon is associated, to activating a function of the display hand computer, to have ham pizza, include in the user's order.

The Restaurant's Menu

The hologram menu shows categories of food item, like, burgers, chicken, salads, breakfast, beverages, coffee, side orders, desserts. The categories are opened by touch activating the hologram that is associated to the category. An item in the category can be associated to an activation of a hologram associated to the item activating the item, which places the activated item on the user's order.

The open category, shows items in the cataroy, such, as opening a burgers category, shows burgers and cheese burger, opening a chicken category shows fried chicken, and chicken sandwiches, opening a food sides show category, shows fries, and onion rings, opening beverages category shows root beer, and ginger ale, opening a deserts category shows apple pie, and vanilla ice cream, opening a breakfast category shows an egg sandwich, and hash browns. A price for each menu item is displayed with the item, like, a garden salad is shown with a price of 1.95.

The restaurant's menu, includes, hamburgers, cheese burgers, peperoni pizza, ham pizza, slice of cheese pizza, fried chicken leg, french fries, fried chicken breast, bean burrito, beef burrito, salmon sushi, scrambled eggs, hot dog, chili, falafel, chicken sandwich, fish sandwich, beef wrap, pork fried rice, shrimp and noodle, salad, egg breakfast, sandwich, salad with chicken, baked potato, meatball submarine sandwich, chicken soup, chocolate donut, coffee, ginger ale, coke, orange soda, milk, and water.

Gesture Operating the Menu Display

Each hologram menu item has a hologram picture icon, that is a picture of the item, such as, a beef burrito icon is a picture of the beef burrito. The menu food, and drink icons are inputted by touch, into an order associated to the user.

Items in the order can be removed by hologram inputting the item in the order, which displays a check mark next to the item. The user touches a remove item icon, and the check marked item is removed from the order.

Items put on the menu, such, as chicken sandwich, can be removed from the order, by touch choosing the sandwich displayed on the order, which highlights the sandwich, and then touch activating a remove icon, which removes the sandwich from the order.

Self-Serve Restaurant Payment

The hologram hand display shows order payment menu input icons, that include, a cash payment, credit or debit card payment. A product order total price amount is displayed.

The user views the different input commands, on the hologram hand display, such as, a ten-key number pad, amount of purchase, accept purchase amount, enter, and credit card number.

A qwerty keyboard can also be displayed, buy touch activating a keyboard symbol icon, to allow the user to try in special orders, or search for special orders, like, cheese burger with extra cheese, an extra onion. The typing is shown on the display. The user touches a enter hologram, and the shown text item is displayed. The search results are shown on the display.

If no search results are shown, the typed text is show with the item so the restaurant kitchen, changes the item according to the text. The burger will be displayed with the text to add extra cheese.

Inputting Payment Numbers

The user touch inputs numbers into the display pad, by individually touching the numbers, such as, a number 2 hologram. The numbers can be entered, to input a debit card, or credit card pin number into the computer. The input can be shown on the display.

The user views the different input commands, on the display, such as, a ten-key number pad 1, 2, 3, 4, 5, 6, 7, 8, 9, 0, amount of purchase, accept purchase amount, enter, and credit card number.

The user inputs numbers into the display pad, by individually touching one of the numbers, such as, a number 0. The numbers can be entered, to input a debit card, or credit card pin number into the computer. The input can be shown on the display.

A credit card can be read, by a credit card reader, at the station. The credit card can be read by opening the user's financial account, such as, bank account, electronic commerce (e-commerce) company account, debit card, credit card account over the internet, and paying from the account. The computer inputs a PIN number, inputted by the user.

The payment information is displayed on the display can be used as, a self-serve checkout display, where the user checks out their own purchases. The payment display can also be, a served checkout payment display, where an employee of the restaurant, checks out the user's food or drink purchases, and accepts payment for the purchases.

The data inputted by the user into the hologram hand display, is displayed on the display. The displayed data keeps the user informed about the payment stations operation, and interaction with the user. The user can use the displayed data, to adjust the operation of the payment menu, such, changing a personal identification number PIN number if a first number is incorrect.

Connections Between Hand Tracker and Store Computer

The laser hologram hand display kiosk connects to a hand kiosk computer. The hand computer connects to a restaurant computer. The restaurant computer connects to a restaurant display.

A single computer, can act as the kiosk hand gesture computer and restaurant computer. Connecting to a restaurant employee display, and the hand display. The single computer can connect to multiple kiosks in the restaurant. The order kiosks can each take orders from users at the same time.

The hand kiosk computer has restaurant checkout payment station operating software, computer operating software, and hand tracker operating software.

The hologram kiosk computer operates the menu and payment display, and the hand tracker. The hologram hand computer can act as the primary computer, for the menu display, and operate the payment functions, or can connect to the restaurant computer that operates the menu and payment.

Restaurant Employees Viewing the User's Order

The menu items inputted by the user into the hand display, is sent to the restaurant display. The restaurant employees view the user's order. The employees prepare the ordered food. A number or picture, taken by a camera in the kiosk and connected to the computer, of the user is assigned to the user's order. The prepared food can be picked up by the user or delivered, to the user's table.

Transference of bacteria from the payment station touch control panel is reduced, by touching the laser holograms, of the touch free hand menu control panel to order food.

A Radar Sensor Used to Detect Hand Gestures

The hologram hand gesture, finger gesture system, uses a sensing technology that uses a miniature radar to detect touch gesture interactions with the laser holograms. An interaction sensor that uses radar for motion tracking of the human hand. The chip incorporates the entire sensor and antenna array into an ultra-compact 8 mm×10 mm package.

How the Sensor Works

The sensor technology works by emitting electromagnetic waves in a broad beam. Objects within the beam scatter this energy, reflecting some portion back towards the radar antenna. Properties of the reflected signal, such as energy, time delay, and frequency shift capture rich information about the object's characteristics and dynamics, including size, shape, orientation, material, distance, and velocity.

Radar Signal Visualization with Baudline

The sensor tracks and recognizes dynamic gestures expressed by fine motions of the fingers and hand. In order to accomplish this with a single chip sensor. The sensor uses a radar sensing paradigm with tailored hardware, software, and algorithms. The sensors, do not require large bandwidth and high spatial resolution.

The sensor's spatial resolution is coarser than the scale of most fine finger gestures. Sensing principles rely on motion resolution by extracting subtle changes in the received signal over time. By processing these temporal signal variations, the system can distinguish complex finger movements and deforming hand shapes within its field.

The system software architecture consists of a generalized gesture recognition pipeline which is hardware agnostic and can work with different types of radar. The pipeline implements several stages of signal abstraction: from the raw radar data to signal transformations, core and abstract machine learning features, detection and tracking, gesture probabilities, and finally UI tools to interpret gesture controls.

Two modulation architectures: A Frequency Modulated Continuous Wave (FMCW) radar and a Direct-Sequence Spread Spectrum (DSSS) radar. Both chips integrate the entire radar system into the package, including multiple beamforming antennas that enable 3D tracking and imaging with no moving parts Fast Food Self Serve Restaurant Hologram Kiosks Operation The user uses finger following and hand gesture touch to activate, the start hologram order icon in midair. The items that the user orders are part of the order. The order is assigned to the user, with a number, or a picture of the user taken by a picture camera in the display. The order is viewed by the employees.

The User Uses their Hand to Touch Activate the Displayed Icons

The user uses their hand to touch activate the displayed icons, that they want activated. The user touches with their hands one of the displayed icon items, that they want to activate, such as the hologram french fries input icon.

The french fry's icon is touch clicked and activated. The activated fries, is put on the user's order.

The user can touch active another icon command, after the first command is activated. Other commands include, a cancel icon, and the number 2 input number. The user completes their order, and touches a finish and pay enter icon.

The user pays with the credit card and waits, for their order to be prepared. The user's order can be pickup by the user in the restaurant, or it can be delivered to a booth, or table the user is sitting at.

Example of Restaurant Operation

The user touches the restaurant start icon to activate, the start order icon. A menu is displayed. The items that the user orders are part of the order. The order is assigned to the user, with a number, or a picture of the user taken by the camera. The order is viewed by the employees.

The user touches the icon that they want activated. When the finger touches the icon, the icon is activated, reinforcing the view of the finger in contact with the icon, with the two visual feedbacks of the finger's contact and highlight, the user knows the finger has contacted the icon.

The user touches one of the displayed icon items, such as the soda drink input icon. The soda drink icon is clicked and activated. The activated soda drink item is put, on the user's order.

The user can touch active another icon command, after the first command is activated, like, fries, 7up soda, coffee. Other commands include, cancel, change order which allows the user to delete, remove items put on the order.

The change icon can also be used, to activate icons that are increase order size icons, like, make the drink a larger size, or fries to a larger size, extra cheese, or extra ketchup. Numbers 0-9 icons on a ten-icon pad, can be imputed for number of items, like, three 3 chicken sandwiches, or 2 strawberry milk shakes.

The user's finger contacts the ham pizza icon, on the display. The ham pizza icon is highlighted. The hand touched ham pizza icon is left clicked and activated. The activated ham pizza icon is associated, to activating a function of the computer, to have ham pizza, include in the user's order.

The user completes their order and touches, a finish and pay enter icon. The user pays with the credit card that is on their phone. The restaurant receives the paid order. The user waits for their order to be prepared. The restaurant sends the kiosk or a restaurant display a notification that the order is ready. The user can pick up the order in the restaurant, or it can be delivered to a booth, or table the user is sitting at.

Holograms can Also be Associated to Displayed Food Menu Commands by a Sign Description and Operation The holograms can be physically associated to, displayed fast food kiosk menu hologram commands. The kiosk menu operations, menu commands can be described by a sign with text, or a sign with symbols that describe the activation of the operation of the menu, that the activation of the described operation is associated to.

The commands are underneath the holograms, or next to the holograms. The user can view the holograms, and the commands at the same time.

The holograms can be different in shape, then the written words or symbols that are displayed, and the holograms are associated to. For example, a hamburger input is displayed, and a hologram in a shape of a triangle is displayed above the displayed hamburger order input. The triangle is associated to the hamburger order, by the triangle's visual location in relationship to the hamburger's location.

Each physically displayed menu command visually describes the operation of the menu that the displayed menu command is associated to, like, the described French fries, or a symbol displayed for the fries is associated to an activation of the fries order operation of the kiosk menu.

The touch activation of the star, is associated to an activation of the physical described fries order. The activation of the physical described fries order operation of the menu is associated to the activation of the fries order operation.

Touch activation of the star, is associated to an activation of the fries order. The activated fries, activates the fries command in the computer. The activated fries computer command, carries out the fries order command of the computer, which activates the menu to place the fries on the order.

The displayed commands can be on an electronic display, or a printed, or sculpted, like, raised letters in plastic. The laser beam used to create the hologram above the back wash, can be perpendicular, or parallel to the fries order location.

For example, an orange soda order input is displayed, and a hologram is displayed above the orange soda that is in a shape of a cube. The cube is associated to the orange soda order, by the cube's visual location in relationship to the orange soda order's location.

Touch activation of the cube, is associated to an activation of the orange soda order. The activated soda order, activates the soda order command in the computer. The activated soda order computer command, carries out the soda order command of the computer, which activates the kiosk menu to place the soda order on the order.

For example, chicken sandwich, burrito, and cheese pizza orders are displayed, on the display screen. Next to the displayed chicken sandwich is a blue, green, and purple butterfly hologram floating in midair, and a touch activation of the butterfly is associated to the activation of the chicken sandwich order by both of their locations in relationship to each other. Next to the displayed burrito is an orange sphere midair, and next to the displayed cheese pizza is a red pyramid midair.

The user touch activates the butterfly, which activates the associated chicken sandwich, and the chicken sandwich order operation is activated, which activates the menu to place the chicken sandwich on the order.

The user touch activates the orange sphere, which activates the associated burrito order, and the burrito order operation is activated, which activates the menu to place the burrito on the order.

The user touch activates the red pyramid, which activates the associated cheese pizza order, and the cheese pizza order operation is activated, which activates the menu to place the cheese pizza on the order.

The Restaurant's Menu

The hologram menu shows categories of food item, like, burgers, chicken, salads, breakfast, beverages, coffee, side orders, desserts. The categories are opened by touch activating the hologram that is associated to the category. An item in the category can be associated to an activation of a hologram associated to the item activating the item, which places the activated item on the user's order.

The open category, shows items in the category, such, as opening a burgers category, shows burgers and cheese burger, opening a chicken category shows fried chicken, and chicken sandwiches, opening a food sides show category, shows fries, and onion rings, opening beverages category shows root beer, and ginger ale.

Opening a deserts category shows apple pie, and vanilla ice cream, opening a breakfast category shows an egg sandwich, and hash browns. A price for each menu item is displayed with the item, like, a garden salad is shown with a price of 1.95.

Scrolling a Page of Food Items

Food items holograms can move on a page of items, up or down, with up or down holograms. The display shows which holograms, on the items on the page that the holograms are associated to, by location, or a line from the item to the hologram.

For example, a category showing 17 different types of burgers, can be moved up or down. The page only shows 8 burgers at a time. When the page of burgers stops its movement, the burgers may not be completely aligned with the holograms, but they still show which hologram each burger is associated to. The location of the burger, or lines from the burgers to the holograms, shows which hologram each displayed burger is associated to Hologram Input Self Driving Car Description A car control panel display, and finger, or hand gesture cameras or sensors, are positioned inside of a self-driving car, self-driving vehicle, car that drives itself. The finger tracker views a user's fingers, when they positioned in front of a laser hologram display, when the user is inside the car. The finger tracker, radar sensor, allows the user, to use finger contact with the holograms, and or area 0.5 cm near the hologram, to activate the hologram input icons, displayed on the display.

The self-driving vehicle, can be a car, bus, tractor trailer, airplane, ambulance, motor cycle, boat, subway train, space ship, train, mini bus, or taxi, a ride-hailing, peer-to-peer ridesharing, taxi cab hailing, food delivery, and bicyclesharing bicycle.

Finger Icon Activation Steps, Finger Touching a Hologram

The finger tracker detects where the user's finger, fingers, or hand are viewable. An input area is associated to the location of the finger in midair, in relationship to the displayed holograms. The camera follows the movement of the finger, in mid-air. The finger can be perpendicular, or at an angle to the display, for the camera to follow it.

The finger moves, to an input icon to activate the icon. The finger tracker detects when the user's finger position, is in front of one of the icons.

The user's finger is position in front, or near an enter input icon. The positioned finger, moves to contact a enter icon. Contact of the finger to the enter icon, highlights the enter icon and activates it. The user feels the contact of their finger with the hologram. The user views the contact of their finger with the hologram.

Finger Activation of Icon

When the finger is in the area 1 cm above the hologram, the hologram is highlighted. The hologram is activated when the finger touches the hologram.

When the finger contacts the enter icon, and the icon is highlighted. The user continues the movement of the finger, to 0.3 cm below the enter icon, in midair, to contact an activation plane, and activate the enter command, contacted by the finger.

The enter input is activated. The activated enter input is used, to enter an input, for the car.

Additional gestures can be used, to activate an icon. The computer is programmed with hand, and finger gesture recognition software, for detecting the finger's, or hand's contact with invisible activation planes near the holograms. The user's hands, or other device like, a pencil, are detected when contacting the holograms, and will activate the contacted hologram.

A Signal that the Icon has Activated

A signal that the icon has activated, is sent to the car computer, to operate a function of the car. The car receives the signal, to operate, influence the function of the car. The car uses the received function signal, to operate the car.

The display receives, and displays feedback, from the computer in the display, concerning the influence the activated computer function, has had on the display computer.

The display receives, and displays feedback, from the computer in the car, concerning the influence the activated car function, has had on the car A Map for Choosing Destinations The display shows, car input buttons, such as, start car, stop car, a displayed interactive internet GPS map, air fan speed increase, or decrease button, heat temperature thermostat increase, or decrease temperature button.

The map is used by the user, to touch request the car to travel, to a chosen destination on the map. The map can be display in 3D. The input icons, can be displayed two dimensionally 2D, or three dimensionally 3D holographically. The map can be displayed by the holograms, or a liquid crystal display.

The user can zoom into and out of the map. The map is a graphic representation of the area, with written descriptions, such as, streets, street names, buildings, names of points of interest, like, parks, stores, restaurants, metro stations. The map can be a picture view, such as, a street view of the locations.

The display computer's location can be found using the display's global positioning system GPS, or display cell phone location. The map includes the car's locations on the map, by associating an avatar on the map to the car.

Finger Tracker and Device Connections

The display connects to a finger tracker computer. The finger computer connects to a car computer. The finger computer has, finger computer operating software, and finger tracker operating software. The finger computer operates, the display and operates the finger tracker.

The finger computer uses artificial intelligence software. The finger trackers are positioned to view the fingers contact with the holograms. The holograms are positioned to be viewable by the user inside of the car.

The car computer connects to the car, and the car's devices. The car computer has car operating software. The car computer operates the car, or connects to other computers in the car, that operate the car.

The car computer has car operating software, and the car computer has car operating software. A wireless, or wired connection, may be between, connect the devices, finger gesture tracker, display, and computers.

Monitoring Multiple Users

The computer can monitor multiple users with the finger tracker. Multiple finger trackers, can be connected to the computer. The computer can monitor multiple users, by using one or multiple finger trackers.

The display can have more than one finger tracker. More than one display, with a finger tracker, can be positioned in the interior of the car, and be connected to the computer. The computer can connect to a central computer, a server on the internet, which is connected to the car computer, and do cloud computing.

Two or more users can touch input into the display, at the same time. Two or more holograms can be operated on the display. Two or more of the displayed inputs, can be highlighted at the same time.

The Car's Devices

The car's devices can include, radio, climate control temperature, head lights, interior lights, ignition on or off, air fan speed, air venting defrost or feet warming, movies, computer games, social media web sites, engine temperature, oil warning light, and seat belt disconnected warning.

The display can display a speedometer, to show car speed. The display shows, amount of fuel indicator, electric power battery percentage, or gasoline amount, climate control, air conditioning, and heat settings. The display can be the holograms or in part a lcd display.

A wireless internet connection to the car computer is used to, surf the internet with a web browser, check the weather, watch movies on demand by movies services, interact with social media, and video chat.

The holograms or lcd graphical interface includes car device components commands, such as, radio station search, pre-set radio stations, increase or decrease radio volume, heat increase or decrease, fan speed increase or decrease, windshield wipers on, wiper speed increase or decrease, displaying a global positioning system GPS map, headlights on, and headlight low or high beam. All the devices listed, have a displayed on off switch, either the off or on function of the switch, can be activated by finger following, and gestures.

The holograms or lcd radio interface includes, a graphic number station indicator, a sound volume indictor, a switch to another device switch, sound volume increases or decrease holograms, and radio station change station increase or decrease holograms.

The vehicle is equipped with computers, that are connected to the car's computer, including, pedestrian or vehicle detection sensors, radar, and vehicle cameras and sensors (not shown).

Car instruments can be displayed, such as, speedometer, engine revolutions, engine oil pressure, engine oil alert, engine temperature, and engine temperature alert, and check engine lights.

Displays Connection to Internet

The display can connect to the internet. The display's or car computer connects to a cell phone tower, using radio wave transmitters, and receivers. The tower connects to an internet router for the tower. The tower router connects to a web server for the tower. The tower web server connects to the internet.

The Icons can Operate Different Functions,

The icons can operate different computer functions, such as, an internet operation, a car operation, or a computer operation. A touch hologram or lcd screen, displays browser input icons used in internet operations, to display a search web page.

Input icons are displayed on the holograms or lcd displayed web page, such as, an internet search operation. The search operation, is used to search the internet. The user types letters, and numbers into the search operation, using a holographic qwerty keyboard in mid-air, information requested by the user, and activates the search operation. The results of the search are displayed.

The icons show computer functions, such as, an center input, or command. The icons show car functions, such as, a light on icon, which is used as part of the car.

The holograms or lcd can be zoomed in using finger gestures of two fingers touching the display. To zoom in to the view of the display, the fingers are moved apart, to zoom out the two fingers can be moved toward each other.

The display operates as a touch screen, with the same finger gestures that that are used with a touch screen, being used with the hologram laser touch screen. The fingers contact with the holographic display, acts as a cursor and mouse left click on the display.

Sending the Device, the Activated Device Function

A signal that the icon has activated, is sent to the car, to operate a function of the car. The car receives the signal to operate the function of the car. The car uses the received function signal, to operate the car.

The display receives, and displays feedback, from the computer in the display, concerning the influence the activated computer function, has had on the display computer.

The display receives, and displays feedback, from the car computer in the car, concerning the influence the activated car function has had on the car.

Menu Help Instructions

A hologram help icon labelled help, can be displayed, that the user touch activates, which displays instructions on how to operate, the touch hologram device system, such as, explaining how to touch the icons and touch a device's icon to display the car control panel, which displays its different car operations or car items which are hand touch activatable.

Hologram Input Self Driving Car Self Driving Car Operation

Requesting the Car Move to a Location

The GPS internet map shows the user's present location, on the displayed map. present location can be shown by a symbol, such as, a circle.

The Map

Finger touch is used to input a destination location on the holograms or lcd map, that the user wants the car to move to. The user finger touches, and the finger gestures creates a point on the map, or inputs the location, on the map, that the user wants the car to move to.

The move to location, is highlighted with a visual, clue, such as a dot, a flag, on the displayed map. The use can move, the move to location dot to another location, by grabbing the dot with the finger, and having the dot follow the finger to another location. The user can input multiple routes, that are followed consecutively by the car, by inputting a second destination.

Searching for a Location, or Address

The map has a search icon. The activated search icon opens a search window, and displayed hologram keyboard. In the search window is typed building addresses, names of businesses, names of locations, streets, street names, buildings, names of points of interest, like, parks, stores, restaurants, metro stations, city names, and hospitals. The map can be a picture view, such as, a street view of the locations.

The found locations are displayed on the map. Each of the displayed devices icons has a description associated to the icon, each description describes the icon that it is associated to, like, atm, smart toilet, or gas pump open from 9 am to 10 pm.

Choosing a Route

The user is shown one or more routes, to the desired location. The user's finger touches the desired route, the desired route is chosen. The displayed chosen route is highlighted. A start travel icon is displayed. The user finger touches a start travel icon, and the car starts travelling the route.

The car reaches the destination and parks. A stop travel icon is displayed. The user finger gestures at the stop travel icon, and the car parks safety out of the way of traffic.

An activated voice icon announces the car's location, as it travels. A compass icon points to the north.

Operating the Car's Devices

The user can increase the volume of the radio, connected to the computer, by finger touching, the increase icon, to left click the increase icon. Finger touching a decrease volume icon symbol hologram activates a decrease volume icon symbol of the radio, which decreases the radios volume. The user can view the volume of the radio, on the volume indicator icon.

The user can view a number icon of the radio station, that the radio is tuned to. The user can change the station, by finger touching the radio station change station holograms, increase or decrease icon holograms. The user can switch between the radio receiving amplitude modulation AM, and frequency modulation FM radio waves, by finger touching the change car component device symbol icon.

The user can turn on the head lights, by finger touching the turn on head lights icon (not shown). The user's finger touching, with the light icon is detected by the finger gesture camera, or and hand gesture radar, with hand gesture software connected computer.

The computer activates the turn headlight on function. The computer sends instructions, to the headlights switch to turn on the headlights. The light switch is switched to the on position, in the on position, the lights are turned on.

Driving Safety

If a pedestrian, or vehicle is detected to close to the car, or on a course where the pedestrian, or vehicle may contact the car, the pedestrian is highlighted on the holograms or lcd display. The pedestrian, or vehicle is viewable by a red flashing outline, halo around the pedestrian.

The highlighting allows the driver, to act to avoid possible contact, with the pedestrian or vehicle. The user finger gestures at the, stop car icon, and stops the car, in an emergency.

Displayed Safety Input Icons

The pedestrian or vehicle is detected by sensors, radar, pedestrian or vehicle cameras and sensors in the car (not show), which are connected to the computer. The turn off the car icon, is shown, which turns off the car, if the user feels it's safer for the car to be turned off, such as, if smoke is coming from the car engine compartment.

An evasive safety manoeuvre icon, is shown for the car to take evasive manoeuvres. The user uses touches the, evasive maneuver icon, when the user thinks the car could be driving more safely, or to avoid an obstacle.

Activation of the evasive manoeuvre icon, may slow the car down, and increase the ability of the sensors, and computer, to take driving measurements, which may enhance driving safety.

The user can be altered to take control of the car, and drive the car if there's a malfunction, such as, a problem, with the car computer, or with the car.

Holograms can Also be Associated to Displayed Car Commands by a Sign on a Screen Description and Operation A hologram shaped like, an arrow is located nest to a sign on a lcd display, that says map. A touch activation of the arrow, is associated to activating the map input. The activated map input activates a displaying of a self driving car map on the lcd display.

A hologram is associated to a sign that describes an operation of the car that the hologram is associated to. The holograms can also be associated by physical sign, and location, to displayed car commands, or described car operations.

The car operations, car commands can be described by a sign on a lcd touch screen with text, or a sign with symbols that describe the activation of an operation of a map or car operation, that the activation of the described operation is associated to.

The signs describing operation or operations are underneath the holograms, or next to the map operations holograms. The user can view the map or car operations holograms, and the sign showing described operations at the same time.

The displayed map on the lcd screen in the car, is used to input a destination that the self driving car will go to. The map is used to activate the car, to start moving to the destination. The lcd display is connected the computer.

Each physically displayed car command visually describes the operation of the car, that the displayed car command is associated to. A directions input shown on the map, can be described by text, or described by a symbol.

An activation of, the directions input, activates the directions operation of the map. A touch activation of a star hologram, is associated to an activation of the directions map operation, and is described on the screen as directions. The activation of the screen described directions of the map is associated to the activation of the directions operation the map.

The holograms can be different in shape, then the described operations, which can be written words or symbols that are displayed near the hologram, and the hologram is associated to. For example, a start route sign on the screen is displayed near a hologram in a shape of a green rectangle.

The green rectangle hologram is displayed above the start route. The green rectangle is associated to the start route, by the star's visual location in relationship to the start route's location.

Touch activation of the green rectangle, is associated to an activation of the start route. The activated start route, activates the start route command in the computer. The activated start route computer command, carries out the start route command of the computer, which activates the car to start and continue travelling on the displayed route. The car self-drives to the shown destination, by following the route. The car parks when it arrives at the destination.

Holograms Associated to a Keyboard on a Screen Used to Input Destination Address The map icon on the display is associated to the arrow laser hologram floating in midair. The arrow is touch activated, which displays the map on the screen. The maps search box is associated to a green cone. The cone is touch activated, which displays a qwerty keyboard on the display screen.

The holograms are associated to letters, and numbers on the qwerty keyboard on the display screen. By touching a hologram next to a letter, the letter is inputted in to the search window, like, a purple triangle hologram which is next to the letter u is touch activated.

The activated u letter is entered into the search window. A letter g has a line from the letter to a green cube hologram. The line associates the green cube to the letter g. The green cube is touch activated, and the letter is entered into the search box.

A yellow sphere is above the number 9. The yellow sphere, and the number 9 are both visible to the user. The yellow sphere is touch activated. The activated number 9 is entered into the search box.

The user enters the address, or name of a business, or category of business in to the search box, with the keyboard. The address is visible. The user touch activates a blue pyramid associated to a enter key icon displayed on the screen, or on the keyboard. The searched address is shown on search box on the map. The entered address is shown on the map by a symbol, like, a flag at the location of the address on the map.

The directions star hologram is touch activated. Multiple routes from the car's location to the address are shown on the map. Each route shows the time to the destination address.

A different hologram can be associated to each route, like one route can be associated to a blue oval. A touch of the hologram associated to one of the desired routes activates the route associated to the hologram. The touch activation of the green rectangle, is associated to an activation of the start route of the car.

The map shows the cars location on the map as it self-drives to the shown destination. A speaker connected to the computer, can also broadcast thru the speaker the cars location, and upcoming changes of the route, like, turn left onto west street in 140 meters. The car stops when it reaches its destination, and parks.

The displayed commands can be on an electronic display, or a printed, or sculpted, like, raised letters in plastic. The laser beam used to create the hologram above the operations described on the screen, can be perpendicular, or parallel to the operation on the screen.

Using the holograms allow the user to operate the self driving car, without touching a physical control panel. Touch free operation of the car, may reduce touching bacteria on a psychical control panel, such as, on a riding sharing car, taxi, mini bus, where there may be users that might leave bacteria on a physical control panel.

A on Off Light Switch with Touch Input Holograms Description

Midair Holograms Created by a Femtosecond Laser

Figure 3:
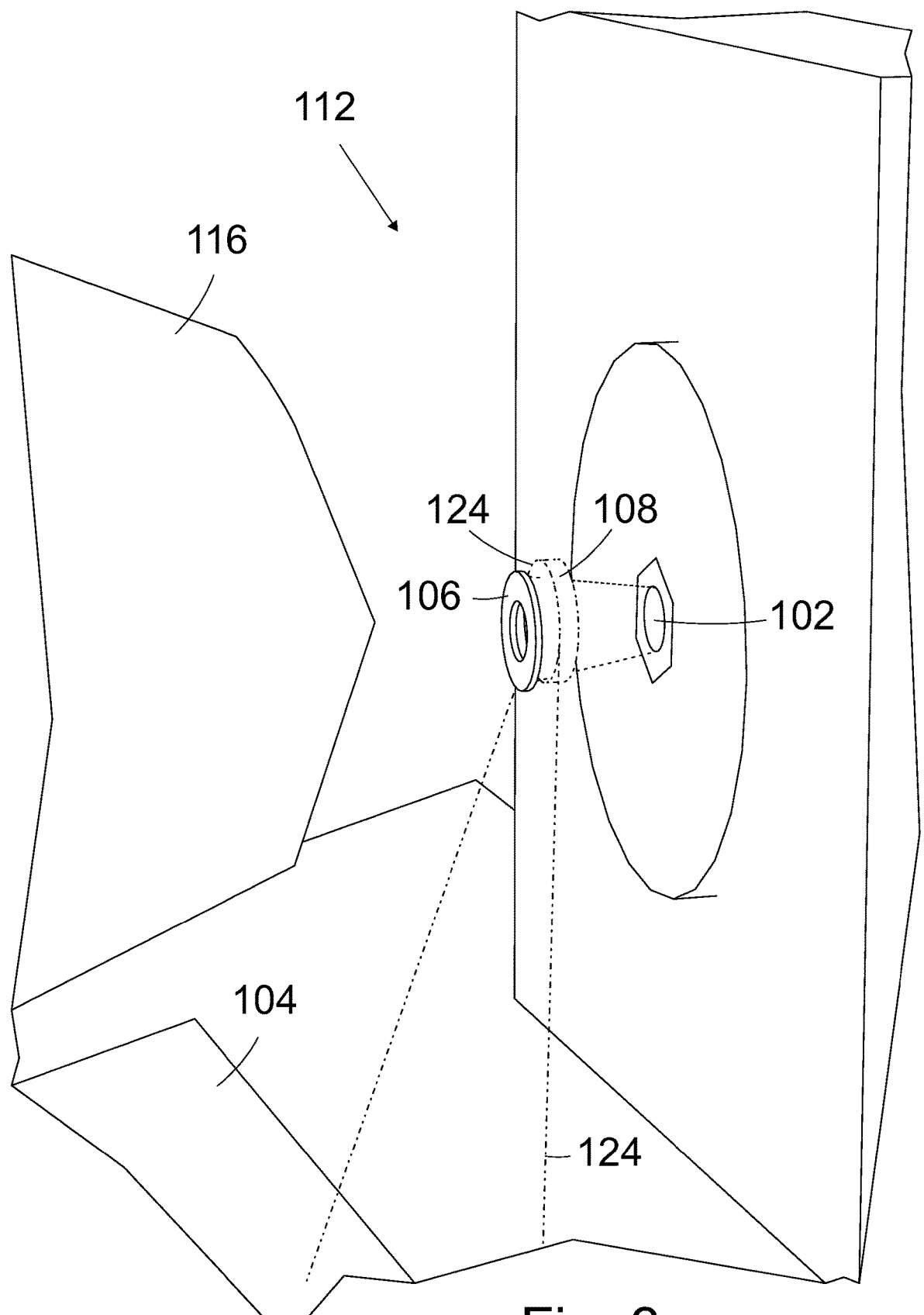
FIG. 3 is a perspective view of a mid-air hologram, arranged as a touch input button for a light on off switch.

A femtosecond laser device 102, is used to create a holographic on off light switch 112, which floats in the air, located in mid-air, and is touch activated. The laser creates aerial plasma images, a mid-air hologram, volumetric display's, three-dimensional 3D display's, aerial and volumetric graphics, or aerial holographic button's 108, as shown in FIG. 3.

Mid-air haptic touch 108 is created by the laser, and occupies the same space as the hologram. The two lasers are positioned to project holograms 4 cm from the lasers, and are located 3 cm vertically from each other.

The femtosecond laser is connected to a computer. The femtosecond laser uses mirrors and cameras to create three-dimensional, interactive holograms 108. The holograms are comprised of tiny points of light called voxels.

Using femtosecond lasers, the device can make holograms that are safe to touch. A femtosecond is a quadrillionth of a second, and the lasers transmit bursts that last 30 to 270 femtoseconds. The images are three-dimensional, with resolutions up to 200,000 dots per second. The voxels are light emitted by plasma, that's created when the laser's focused energy ionizes the air.

The lasers fire at such a high speed, they're able to react in real-time. The lasers can create usable holograms, such as, checkboxes, and hearts that change their look when touched. The user's touch of the voxels generates a shockwave, which the user feels as a pulse. The voxels respond in real-time to these touches.

To create the hologram, the femtosecond laser fires through a spatial light modulator, which continues the beam through a series of lenses, a mirror and a Galvano scanner, which positions a mirror to precisely direct the laser beams. A camera underneath the hologram captures the user's interaction, allowing the dots to respond to being touched.

A Camera for Detecting a User's Touch of the Hologram

A camera with a view of the hologram, captures and records the user's touch interactions with the hologram. The camera is positioned to view a user's finger's, contact with the hologram. The camera detects the user's finger, touching the hologram.

A second mid-air hand gesture recognition sensor 104, mid-air finger location detector, is connected to the computer. The second gesture sensor acts as a back up to the laser device's mid-air sensor. The second sensor also views a larger mid-air area. The second gesture recognition sensor can be a sensor, and or camera. The camera is a gesture recognition camera.

An Input Associated to a User's Touch of a Hologram

When the computer receives input, that the user has touch inputted, an on or off command, the computer signals the light switch, to activate the corresponding on or off switch function. The on-input command turns the light on, and the off-input command turns the light off.

Software

The computer is connected, to the on off light switch. The computer is programmed with software, to instruct the on off switch to either be on or off. The instructions can turn the light on or off. The computer is programmed with a software, for operating the computer. A device, which is the light switch, is connected to the computer. The computer is programmed with gesture recognition camera software.

Different Shaped Holograms

The mid-air hologram, and a mid-air haptic touch area 108 are located in the same mid-air location, and are created by the laser. The hologram is shaped like a circle, 0.3 centimetre cm in width. The holograms shape can change when the laser detects a finger contacting the hologram. The holograms largest viewing area, is positioned flat perpendicularly, 5 cm from a wall. The laser is in the wall. The laser projects laser beams 122 outwardly from the wall. The holograms can be different shapes, colors, letters, and numbers, etc. The holograms are volumetric, they have volume, depth, width and height.

Various Devices can have Holographic Input Buttons

More than one laser, can be used to the create the mid-air input display. Other devices that could use the display, include, an elevator control panel, a store checkout payment station, a gas pump, a space station display, a medical environment holographic keyboard, a flammable environment input display, an anti-static environment input display, an ATM machine, a smart phone, a car dashboard control panel, a driverless car dashboard control panel, a smart toilet, and a tablet computer, etc.

The laser devices may also be used with many different devices, such as, a toilet remote control display, a vending machine display, a store credit card or debit payment machine display, an outer space station control panel, a bank ATM display surface, a medical display surface, and an elevator control panel, etc.

Alternatives to the Camera

The mid-air recognition sensor 104 could also be infrared sensor, or a laser beam who detects the finger when the laser's beam is broken by the finger. Other three-dimensional sensors 3D and cameras could be used, such as, ultrasonic mid-air gesture recognition sensors, a nano camera using light reflection, to determine the location of a user's finger, and a sonic sensor which uses ultra-sonic waves for finger detection.

Safety of the Lasers

The holograms are made up of thousands of laser dots or plasma voxels. The laser creates 3D images with resolutions of up to 200,000 dots per second. The laser is safe for contact with skin, due to one plasma voxel lasting 40 quadrillionths of a second, which is a safe amount of energy to contact the skin. The laser is able to create multiple plasma voxels with one laser pulse.

Power Supply

A motor controller (not shown) is connected to an alternating current power supply. The current is supplied by a building power connection. The motor controller supplies power to the touch free devices components, such as, the camera, the laser device, etc. The computer communicates with the components. The display devices components, are connected to the motor controller and the computer. The components include the femtosecond laser, the computer, and the light.

For brevity when referring to the device's connections to the computer, it is implied that the devices and the computer communicate with each other. The devices can also connect to the motor controller, with electrical wire which supplies electrical power to the devices.

Avoiding Touching Bacteria on Input Surfaces

The mid-air display allows users to input into the display without having to touch an input surface. Not having to touch the surface, eliminates the possibility of a transference of bacteria, or viruses to the user's fingers, from bacteria, or viruses on the touch surface.

A on Off Light Switch with Touch Input Holograms Operation

Visual Feedback from Holograms

The user's finger 116 contacts the circle mid-air hologram 106, as illustrated in FIG. 3. The shape of the circle visually changes to a star (not shown). The haptic feel of the hologram, may be comparable to a feeling similar to touching sand paper, or feeling mild static electrical discharges. The feel 106 informs the user that they have contacted the hologram. The change of shape of the hologram, gives visual feedback, that their finger has contacted the hologram.

Turning the Light On or Off

The camera and computer visually 124 detects the user's finger's contact, with the predetermined invisible mid-air input area 124. The camera sends the visual location of the finger, in mid-air to the computer. The computer interprets the finger's contact with the area, as a mid-air touch input.

The input changes the switch from its present position, to the other position, for example, if the switch is in the off position, the touch input of the finger, will turn the switch to the on position, and vice versa.

The feedback information, that the hologram has been contacted, informs the user that the contact, is interpreted as an input, into the light on off switch. When the finger is removed from the input area 108 the computer, interprets a next finger contact with the area, as a next input.

Finding the On Off Switch

The laser 102 can remain continually on, continually creating the hologram, or can turn off when not in use. The switch 112 can also turn on from an off state, and create the hologram, when the user's hand is detected within 30 centimetres of the switch, by the camera. The laser can turn off after 20 second, when use of the switch isn't detected.

A sign near the switch can describe the operation of the switch, as an, 'on off switch', and give instructions on how to use the switch. The instructions could say, place hand within 30 cm to activate the hologram, then touch the hologram to turn the light either on or off.

The holograms can be programmed to change shape, move, when being touched. Without being touched, the holograms can change shape, and move.

Storage

These computer program instructions may also be stored in a computer-readable medium that can direct a computer or other programmable data processing apparatus, to function in a particular manner, such that the instructions stored in the computer-readable medium produce a function of a device, including instructions which implement the function act specified in the flowchart and or block diagram block or blocks.

The computer program instructions may also be loaded onto a computer or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram block or blocks.

The computer may further include on-board data storage, such as memory coupled to the processor. The memory may store software that can be accessed and executed by the processor, for example. The host may be any type of computing device or transmitter including a laptop computer, a mobile telephone, etc., that is configured to transmit data to the device. The host and the device may contain hardware to enable the communication link, such as processors, transmitters, receivers, antennas, etc.

The computer may connect to the femtosecond laser, locally, over a network, or at a distant location over the internet. The laser may be connected to a quantum cloud computer, to enable quantum cloud computing.

Communication Links

In the communication link is illustrated as a wired connection, however wireless connections may also be used. For example, the communication link may be a wired link via a serial bus such as USB, or a parallel bus. A wired connection may be a proprietary connection as well. The communication link may also be a wireless connection, such as Bluetooth, IEEE 802.11 or other wireless based communication links. In another example, the system includes an access point through which the device may communicate with the internet. In this example, the device may not require connectivity to the host.

The access point may take various forms. For example, if the device connects using 802.11 or via an Ethernet connection, the access point may take the form of a wireless access point (WAP) or wireless router. As another example, if the device connects using a cellular air-interface protocol, such as a CDMA or GSM protocol, the access point may be a base station in a cellular network that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others.

Furthermore, the device may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

Programming

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

A perceptual computing software developer's kit could be used to build applications for the smart toilet applications. The Microsoft Software Developers Kit can be used build bidet function applications.

Various programming languages can be used to program the computer 106 such as C++, C#, or a Visual Programming Language. The computer may be programmed using, a software development kit. The computer may run a computer operating system.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Hologram for Touch Inputting in a Dust Free Environment Description

Figure 4:
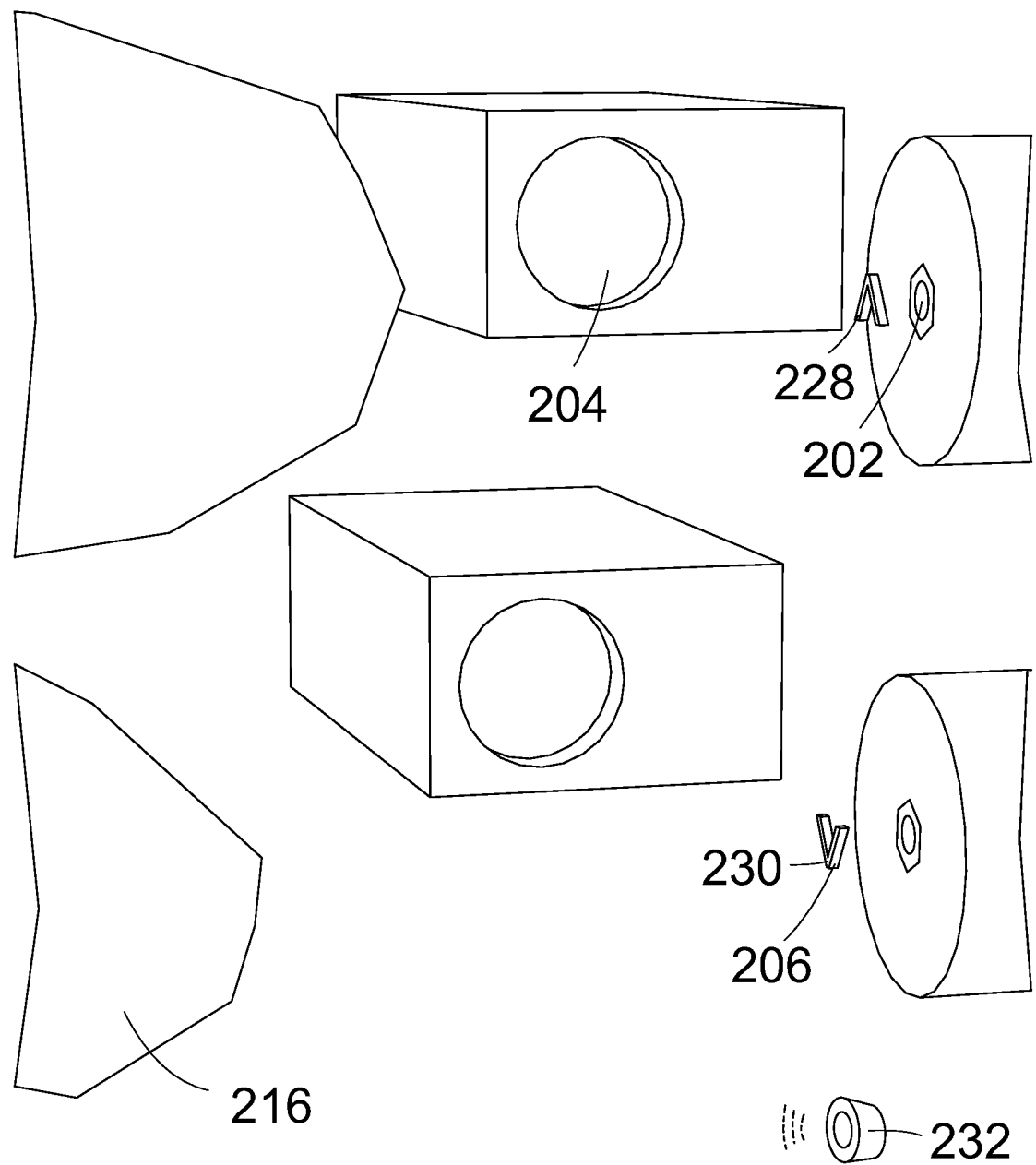
FIG. 4 is a perspective view of a mid-air hologram, arranged as a touch input button for an on off switch in a dust free environment.
Figure 5:
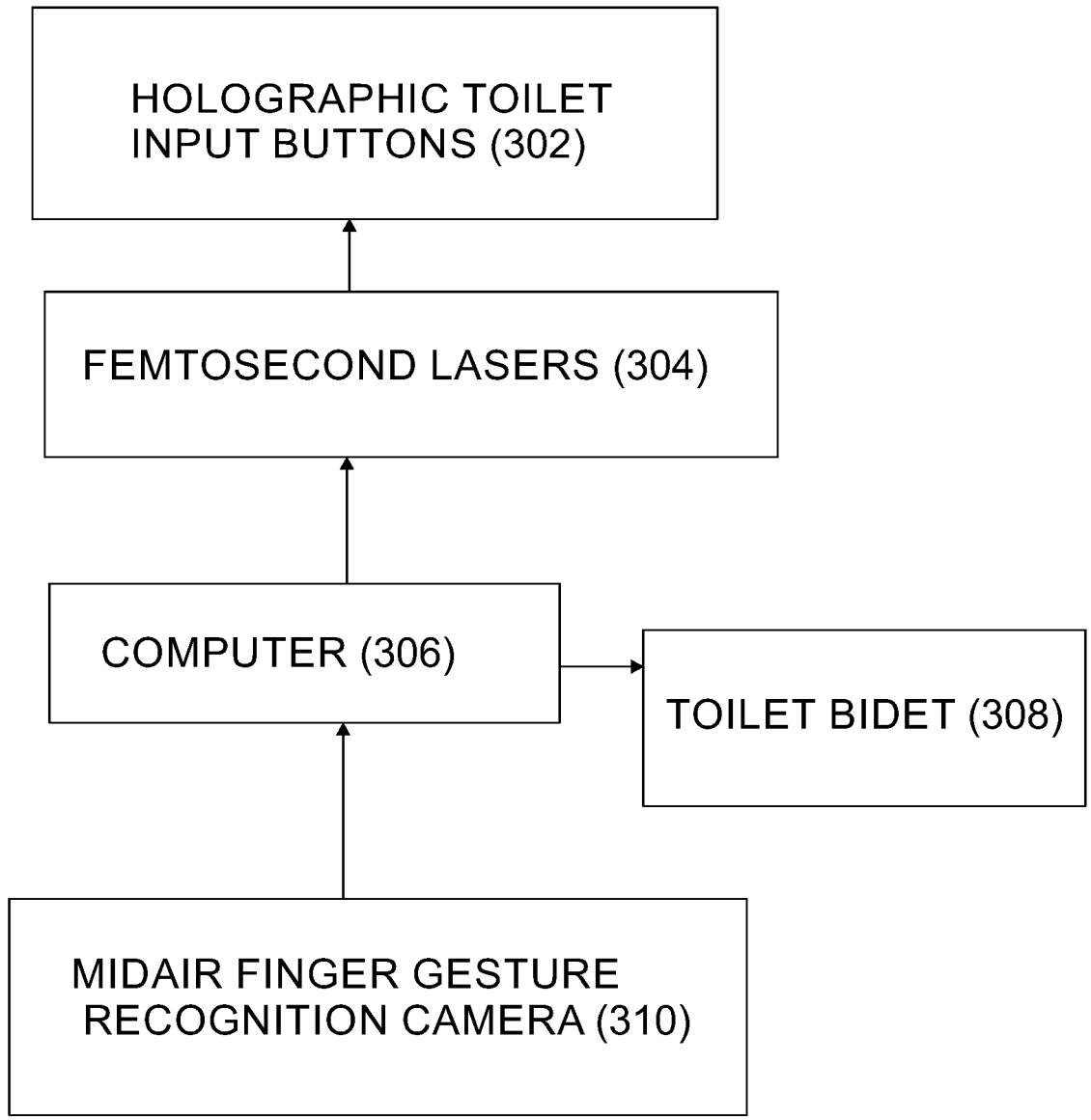
FIG. 5 is a flowchart illustrating a method of operating a toilet bidet with a holographic control panel.

Laser hologram input may reduce dust in a dust free environment, such as, microprocessor fabrication environments, as illustrated in FIG. 4. Hologram input displays don't have moving parts. Input displays with moving parts, may create dust when the parts move, creating friction between the parts, which creates wear between the parts, and dust.

When a finger or glove touches a surface to input, the touching of the finger to the surface, creates friction between the finger and the surface. The friction causes particles from both surfaces detaching from the surfaces, and becoming airborne. The particles then descend to a surface, which creates dust on the surface. Dust on the surface of a microprocessor, may have a negative impact on the microprocessor's production.

Two femtosecond laser devices 202 are positioned to project holograms 6 cm from the lasers, and which are located 3 cm horizontally from each other. The holograms are from 0.03 to 2 cm in diameter. One laser projects an up, or on symbol 228 in mid-air, the second laser projects a down, or off symbol 230 in mid-air. The lasers are connected to a computer. The lasers create aerial buttons with haptic feedback 206, or floating buttons with haptic feedback 206.

A mid-air hand gesture recognition sensor 204, is located to have an operational view of the holograms, to sense a user's finger's contact with predetermined input areas near the holograms. The sensor's software is programmed into the computer.

Input detection areas in mid-air are located 0.2 cm below the area's which are occupied by the holograms. A device (not shown) is connected to the computer. A speaker 232 is connected to the computer.

Hologram for Touch Inputting in a Dust Free Environment Operation

The user views the different hologram button inputs. as illustrated in FIG. 4. Each button is associated to a selection, of one of a variety of operations of a device in a dust free environment. The user chooses a hologram or combination of different holograms to input, to select the desired device operation.

The activated instructions for the operation of the dust free device, is sent to the dust free device. Operations of the device, may include, the turning on or off of the device.

The software detects the images from the camera, of the user touching one of the activation areas. The device's operating instructions associated to the hologram are activated. The activated instructions for the operation of the device, is sent to the device. Operations of the device, may include, the turning on or off of the device, etc.

The user can turn the device on or off by touching in mid-air.2 cm below either the on 228 or off hologram 230. The detected touch is interpreted as an, input by the user, as illustrated in FIG. 3. The input is associated to either an on or off input. The sensor connected to the computer, and detects the touch of the on or off areas. The device's operation is affected by the input from the switch.

Locating the touch input area below the holograms, allows the user to touch the hologram before committing to the touch input. The touch input occurs by moving their finger 216 forward and closer to the lasers, and contacting the input area.

An audible sound is produced by a speaker 232, when the finger contacts the input area. The sound could be a beep sound, or a bell sound, etc. The sound informs the user that their finger, has contacted the input area. A different sound is produced 0.4 cm before the finger contacts the input area, to inform the user that their finger is close to contacting the input area.

A different sound is produced, by the speaker when the finger is 0.5 cm closer to the device then the input area, to inform the user that they are close to touching the device with their finger. The sound enables the user to move their finger away from the device, before contacting it with their finger.

A unique sound is associated to each hologram, that is touched. The sound enables the user to audibly associate the sound, to the hologram they are activating.

A 2D Holographic Input Display for a Toilet Description

Fiber optic femtosecond pulse lasers are positioned, to each project a hologram. Small, medium, and large femtosecond lasers are positioned together to create a holographic mid-air touch display. A computer is connected to the lasers.

The lasers are arranged close together, to create desktop touch input icons. The holograms are arranged, in a computer desktop touch screen configuration. The input icons can be either two dimensional 2D or 3 dimensional, and can simultaneously be created. The display panel can be parallel to the lasers, or be at angles to the lasers.

Mid-air hand gesture recognition cameras, are located to sense a user's finger's contact with the holograms.

The display can also show individual number icons, or a menu of input items, or web pages, which can be touched in mid-air. Each differing icon, is associated with a different computer function. Each differing computer function can affect a different operation of a device. The finger's contact with one of the icons, activates the icon, and activates the computer function associated with the icon.

A 2D Holographic Input Display for a Toilet Operation

The user touches one of the holograms for a toilet, and views and increase in luminosity of the hologram, and feels mid-air touch from the hologram. The user touches one of the display holograms. The touch inputs the input associated with the hologram.

The user can use the mid-air holograms to input, in to the computer, icons associated to toilet operations, letters, numbers, punctuation, and symbols. The user can activate mid-air icons, open internet browsing web pages, word documents, and play computer games.

The input of the keyboard icons, letters, numbers, etc., is shown on the display. The input commands can affect the operation of the computer. The computer can be connected to a device, such as, a printer, to affect the operation of the printer. The computer can connect to the internet, and access content on the internet.

The display senses a user's finger contacting one of a plurality of toilet midair display icons, in mid-air which make up the midair display. The display interprets the finger's contact with the icon, as a touch input activation of the icon. The activation of the icon, activates the computer function associated with the icon. The display can also be a keyboard other than a qwerty keyboard, and or different touch input icons.

A 3D Holographic Input Display for a Toilet for a Toilet Description

Femtosecond lasers are positioned, to create holographic mid-air touch holograms, for a toilet. Gesture recognition sensors are positioned to detect a user's touch of the holograms.

The lasers are arranged close together to create desktop touch input icons. The holograms are arranged in a computer desktop touch screen configuration. The input icons are three dimensional 3D. The holograms can extend outward from the laser, or be located at a distance from the laser.

Each hologram is activated by a detection of the user's touch of the hologram. Each activated hologram is associated to activating one of the operations of the toilet.

A 3D Holographic Input Display for a Toilet Operation

The user touches one of the holograms for a toilet, and inputs, the input associated with the hologram. The imputed input activates the toilet operation associated to the hologram.

An Automated Teller Machine Using Holograms in Mid-air for a Touch Input Display Description An automated teller machine ATM is connected to a femtosecond laser input display. Holograms, three dimensional volumetric displays, are associated to operations of the atm. The operations may include, a variety of different holograms, or hologram inputs, such as, words, numbers, symbols, or letters, for selecting a variety of different atm products.

Ten femtosecond lasers, each produce a holographic number. The numbers range from 1-9, and 0, 1, 2 3, 4, 5, 6, 7, 8, 9 0. The ten laser's holograms create a 10 key pad. The holograms are associated to, and display the numbers 0-9.

The ten femtosecond laser devices are positioned, to each project a hologram 9 cm from the lasers. The holograms are spaced 0.2 cm horizontally from each other The holograms could be projected farther from the laser, such as, 12 cm, 16 cm, or 23 cm, etc.

Four lasers are positioned to each project a hologram 9 cm from the lasers, and which are located 0.2 cm from each other. The displayed text, includes, deposit, enter, yes, no, cancel, clear, and change.

A mid-air hand gesture recognition sensor, or sensors, or camera, or cameras, are located to sense a user's finger's contact within predetermined mid-air areas near the holograms. The predetermined areas are located 0.2 cm below the holograms.

The cameras, or sensors are connected to a computer. The computer is part of the atm. The atm is connected to a server on the internet. The lasers are connected to the computer.

The lasers can also be not connected to the atm computer, with lasers producing the holograms independent of the computer, or the lasers may have a laser computer, that isn't connected the atm computer, or the laser computer could be connected to the atm computer.

Each displayed hologram input corresponds to an operation of the atm that is described by the hologram, for example, the enter hologram when activated by the user's touch of the hologram, activates the enter operation of the atm's computer. An activation of the 1 hologram, enters the number 1 into the computer of the atm.

The user can also touch the word holograms to input the displayed word option. The word holograms, include, deposit, enter, change, etc. The holographic input pad can also be used, to input into a vending machine, a public information interactive display, or a ticket kiosk, etc.

The control panel displays inputs, commands, instructions that can be touch activated by touching holograms. The control panel displays inputs instructions that can be holograms floating in mid air include, deposit, withdrawal, checking, savings, credit, a 10 key number pad, numbers 1, 2, 3, 4, 5, 6, 7, 8, 9, 0, log in, log out, withdrawal 20, 40, 100, enter, change, and cancel. The activated commands can display, and or active different pages on the display, that are associated to the commands, like, activating deposit will display the deposit page.

Holograms Associated to Displayed Commands

The holograms are associated to displayed commands. The commands are underneath the holograms, or next to the holograms. The user can view the holograms, and the commands at the same time. The holograms can be different in shape, then the written words or symbols that are displayed, and the holograms are associated to.

For example, an enter input is displayed, and a hologram is displayed above the enter that is in a shape of a star. The star is associated to the enter, by the star's visual location in relationship to the enter's location.

The displayed commands can be on an electronic display, or a printed, or sculpted, like, raised letters in plastic. The laser beam to create the hologram above the enter, can be perpendicular to the enter location, or parallel.

Touch activation of the star, is associated to an activation of the enter. The activated enter, activates the enter command in the computer. The activated enter computer command, carries out the enter command of the computer, such as, the atm display shows enter 8 dollars for deposit into the user's checking account. The user touches the enter hologram, and the 8 is entered and deposited.

For example, checking, and saving, and credit are displayed, on a display screen. Next to checking is a blue, green, and purple butterfly hologram floating in mid air, and is associated to the checking. Next to savings is an orange sphere, next to credit is a red pyramid. The user touch activates the butterfly, which activates the associated checking, and the checking is displayed with the amount of funds in the account, and the transactions of the account.

An Automated Teller Machine Using Holograms in Midair for a Touch Input Display Operation The user views the different hologram button inputs, which are associated to the selection of one of a variety of financial products. The user chooses a hologram or combination of different holograms, that the user desires to input, to select the desired product.

The user touches the hologram of the input the user wants to input into the atm. The machine uses the user's input to activate machine instructions to operate the machine. Operations of the machine, may include, receiving a selection of a product request dispensing funds, and the delivery of the funds to the user.

The display asks for the user's personal identification number pin. A hologram number ten key number pad, and or key board is displayed. The user's finger moves close to the number that the user wants to input, such as, a number 3. The number 3 is highlighted. The touch at the number 3 is continued, and the number 3 is activated. The activated number forms part of a pin number personal identification number. The user inputs numbers until the pin number is complete.

The user touches a displayed enter input icon, until it activates. The enter input icon inputs the pin number. The user's account information is displayed.

The User can Activate Different ATM Services

The user can activate different atm services, by touching holographic icons displaying, and associated to a checking account balance, a savings account balance, or a credit card account balance. The user can deposit funds, or withdraw funds from the different accounts, using touch of inputs associated to the accounts, shown on the display.

The user's finger's touch is directed to the checking account balance hologram. The checking account details are displayed when the balance hologram is touch activated. The touch is directed at a checking account balance hologram, and a withdrawal amount icon. Withdraw amounts are displayed, such as, 20, 40, or 100. The user can activate with touch, one of the displayed amounts. To enter a different amount, the touch is directed to a different amount.

The ten keypad is displayed, for inputting the different amount. The user touches each number, to input each number, such as, the 2 number first, and the 0 number second, that makes up the amount the user would like to withdraw, of a 20.00 amount. The user touches the enter icon hologram in midair. The withdrawal amount is entered, by touch activating the enter icon. The atm dispenses the 20.00 amount.

The user is asked on the display, if the user would like another request. The user touches a cancel input icon, and the interaction is complete, and the user is signed out of their account. The finger contacts a withdrawal icon on the display. The withdrawal icon is highlighted. The user touches the withdrawal icon which is left clicked, and activated. The activated withdrawal icon is associated, to activating a withdrawal function of the atm.

Examples of Operating the ATM

The user inputs a deposit input, by touching a deposit hologram in midair. The deposit screen is displayed. The user touch inputs 15 dollars, by touching the numbers 1, and 5 on the hologram number pad consecutively. The finger touch activates the enter input hologram. The 15 dollars of currency is deposited, and accepted by the atm, and the accepted deposit is displayed by the display. The user ends the session with the atm, by touching a holographic displayed log out input, to activate the log out input.

Stopping Contact of a User's Eyes with the Laser Beams Description and Operation Using Facial Recognition to Stop an Eye Ball from Getting Close to the Holograms To be have redundant safety measures, with the laser holograms, extra safety devices can used. The atm has a computer. Facial recognition, and or eye ball recognition software is part of the atm computer. A facial camera, or sensor, is positioned to visually detect the user's face eye's distance from the holograms. Also, the camera or sensor that is used to detect the user's finger's contact with the holograms, can also be used to detect the user's face's eyes distance from the holograms.

The facial recognition, and or eye ball recognition, visually detects when the user's face, and or an eye ball is with 45 cm of the holograms in midair form the holograms in midair, and turns off the holograms at the detection of the face at 45 cm. The eyes may not contact the holograms when the lasers are off, due to the holograms not being produced. With the holograms turned off the lasers are turned on when the face is detected at 65 cm.

A sign saying the holograms will be turned off, when the user's face is near the holograms, is displayed and viewable by the user. The sign notifies the user about why the holograms may turn off if the users face gets close to the holograms. The sign suggests that a user avoid contact with the holograms with their eye balls.

The eye ball recognition, visually detects the user's eye ball and or eye balls, surface of the eye ball, iris of the eye, even if the user is wearing, something that may reduce the detection of the face, such as, a surgical mask, ski mask, halloween mask, facial make up, hat, or glasses.

The eye socket is visually detected and the laser are turned off at 45 cm. The eye socket detection, limits a user opening their eye lid while the lid is in contact with the holograms, and possibly exposing the eye to the holograms, even though the eye ball will be recognized by the camera, and the holograms will be turned off before contacting the eye.

Using a Physical Barrier to Stop an Eye Ball from Getting Close to the Holograms Two walls parallel to each other and on opposite sides of the holograms, can be used to create a physical barrier, that limits the user's face, and eyes from being in contact with the holograms, or laser beams. The walls are higher than the holograms, and close enough together, to not allow the user's head and eyes to get near, or too be in contact with the holograms.

The walls allow the user's finger to touch the holograms, which activates the holograms, but not their eye. Different wall shapes around the holograms can be used to reduce eye contact with the holograms, such as, circles, triangle, squares, rectangles, and ovals. The walls can be clear, made out of plastic or glass.

CONCLUSIONS, RAMIFICATIONS, AND SCOPE

From the preceding description and drawings, it becomes apparent that the user, may use laser midair holograms to operate a toilet sanitarily.

The femtosecond laser device, allows a user, to input holograms in mid-air for the toilet. The mid-air input is used to direct the operation of the smart toilet. The user inputs, operates the toilet without the need to contact a physical surface. Avoiding contact with an input surface, decrease the chance of touching bacteria on the surface of the input surface. Avoiding bacteria increases the ability to remain bacterially free, from bacteria which may have a negative impact on the user's body.

Thus, the reader will see that at least one embodiment, of the user hologram display connected to a toilet, provides a more reliable, fun, healthier and economical display, that can be used by persons of almost any age.

It will be apparent that various changes, and modifications can be made, without departing from the scope of the various embodiments, as defined in the claims. Thus, the scope of the embodiments, may be determined by the appended claims, and their equivalents.

The invention claimed is:

1. A toilet has a bidet, the bidet has an input display, comprising:
    a laser beam, the laser beam is produced by a laser,
    the laser beam excites air molecules in mid-air,
    the excited air molecules produce light, the excited air molecules have a feel,
    the feel is felt by a finger of a user in contact with the excited air molecules,
    the excited air molecules are positioned to produce the input display, the input display displays operations of the bidet,
    each displayed operation can be activated by a detection of a touch of the operation by a user's finger,
    each activated displayed operation is associated to an activated operation of the bidet, each displayed operation has a descriptor associated to the displayed operation,
    the descriptor describes one of the operations of the bidet,
    a sensor is connected to a computer,
    the sensor is positioned to detect the finger in a location of one of the displayed operations of the bidet,
    the detection of the finger at a location of one of the displayed operations of the bidet is associated to an activation of the displayed operation,
    the activation of the displayed operation of the bidet is associated to an activation of the operation of the bidet that the displayed operation is associated to.

2. The input display of claim 1, further including the operation of the bidet is displayed on the display.

3. The input display of claim 1, further including a plurality of laser beams, wherein the laser is a femtosecond laser, the input display is a volumetric three-dimensional input display.

4. The input display of claim 1, wherein the descriptor is a descriptor composed of the light as a hologram and or holograms.

5. The input display of claim 1, wherein the descriptor is a sign that describes an operation of the bidet that is associated to the displayed operation.

6. The input display of claim 1, wherein one of the descriptors is a displayed front wash descriptor, wherein one of the operations of the bidet is a front wash operation.

7. The input display of claim 1, wherein one of the descriptors is a back-wash descriptor.

8. The input display of claim 1, wherein one of the operations of the bidet is a back-wash operation.

9. The input display of claim 1, wherein one of descriptors is an increase water pressure descriptor.

10. The input display of claim 1, wherein one of the descriptors is an increase water temperature descriptor.

11. A method for displaying an input display for a bidet, the bidet is positioned on a toilet, comprising:
    exciting air molecules in mid-air with a plurality of laser beams,
    exciting the air molecules to produce a plurality of lights with the plurality of laser beams,
    having the excited air molecules give a touch feel when contacted by a finger of a user,
    describing one of a plurality of operations of the bidet with a descriptor,
    associating the descriptor to one of the lights,
    detecting the finger in an area at or near a location of one of the lights with a sensor positioned to detect the finger in the area at or near the location of one of the lights,
    activating the described operation of the bidet that is associated to one of the lights that the finger is detected in the area of with the detection of the finger in the area of the light activating the described bidet operation associated to the light,
    activating the bidet operation associated to the activated described operation by associating the activated described operation to activating the operation of the bidet that is described by the descriptor with a computer connected to the bidet.

12. The method of claim 11, further providing displaying the operation of the bidet on the input display.

13. The method of claim 11, wherein the descriptor is a descriptor described by the light and or lights.

14. The method of claim 11, wherein the descriptor is a sign that describes one of the operations of the bidet,
the association of the light and descriptor is an association of the location of the light and a location of the descriptor.

15. The method of claim 11, wherein one of the descriptors is a front wash descriptor.

16. The method of claim 11, wherein one of the operations of the bidet is a front wash operation.

17. The method of claim 11, wherein one of the descriptors is a backwash descriptor,
wherein one of the operations of the bidet is a back-wash operation.

18. The method of claim 11, wherein one of the descriptors is a start air dryer descriptor,
wherein one of the operations of the bidet is an air dryer operation.

19. The method of claim 11, wherein one of the descriptors is an oscillating water spray descriptor,
wherein one of the operations of the bidet is an oscillating water spray operation.

20. The method of claim 11, further providing connecting lasers to the computer,
influencing a shape of the described operation when the described operation is activated with the computer influencing the shape of the described operation when the described operation is activated,
wherein the plurality of lights are holograms,
the sensor is a camera,
further providing connecting a speaker to the computer,
producing a sound from the speaker with the detection of the user's finger at a location of the described operation.

* * * * *